US012693392B2

(12) United States Patent
Azuma

(10) Patent No.: US 12,693,392 B2
(45) Date of Patent: Jul. 28, 2026

(54) DISTANCE MEASUREMENT DEVICE

(71) Applicant: DENSO CORPORATION, Kariya-city (JP)

(72) Inventor: Kenta Azuma, Kariya-city (JP)

(73) Assignee: DENSO CORPORATION, Kariya-city (JP)

(*) Notice: Subject to any disclaimer, the term of this patent is extended or adjusted under 35 U.S.C. 154(b) by 812 days.

(21) Appl. No.: 18/064,010

(22) Filed: Dec. 9, 2022

(65) Prior Publication Data

US 2023/0108583 A1 Apr. 6, 2023

Related U.S. Application Data

(63) Continuation of application No. PCT/JP2021/020214, filed on May 27, 2021.

(30) Foreign Application Priority Data

Jun. 12, 2020 (JP) ................................ 2020-102143
Apr. 19, 2021 (JP) ................................ 2021-070064

(51) Int. Cl.
    G01S 7/4865 (2020.01)
    G01S 7/481 (2006.01)
    G01S 17/10 (2020.01)
(52) U.S. Cl.
    CPC .......... G01S 7/4865 (2013.01); G01S 7/4813 (2013.01); G01S 17/10 (2013.01)
(58) Field of Classification Search
    None
    See application file for complete search history.

(56) References Cited

U.S. PATENT DOCUMENTS

| | | | |
|---|---|---|---|
| 2011/0246116 A1 | 10/2011 | Kamitani et al. | |
| 2018/0284229 A1 | 10/2018 | Liu et al. | |
| 2019/0325739 A1* | 10/2019 | Dorum | G01S 19/51 |
| 2022/0342040 A1* | 10/2022 | Hirano | G01C 3/06 |

FOREIGN PATENT DOCUMENTS

| | | |
|---|---|---|
| JP | H05-184002 A | 7/1993 |
| JP | 2009-078745 A | 4/2009 |
| JP | 2009-270492 A | 11/2009 |
| JP | 2015-194356 A | 11/2015 |
| JP | 2015-219120 A | 12/2015 |
| WO | 2020/113360 A1 | 6/2020 |

* cited by examiner

*Primary Examiner* — Luke D Ratcliffe
(74) *Attorney, Agent, or Firm* — Precision Patents, P.C.

(57) ABSTRACT

A distance measurement device includes a light emitting and receiving units, and a calculation unit that uses a time-of-flight to calculate an object distance. The calculation unit includes: a histogram generation unit; a composite peak portion estimation unit that estimates whether a composite peak portion is present in a histogram, the composite peak portion being a peak portion at which the received light intensity changes with respect to the time-of-flight with reference to a peak time-of-flight and which is obtained from a combination of distributions of intensity of light from objects, differences of distances to the objects from the device being within a predetermined range; a time-of-flight specification unit that specifies rise time and fall time; a base time-of-flight determination unit that determines a base time-of-flight based on the rise time or the fall time; and a distance calculation unit that uses the base time-of-flight to calculate the object distance.

8 Claims, 19 Drawing Sheets

SECOND EMBODIMENT

SECOND EMBODIMENT

SECOND EMBODIMENT

SECOND EMBODIMENT

THIRD EMBODIMENT

FOURTH EMBODIMENT

FOURTH EMBODIMENT

FIFTH EMBODIMENT

FIFTH EMBODIMENT

SIXTH EMBODIMENT

SEVENTH EMBODIMENT

DISTANCE MEASUREMENT DEVICE

CROSS-REFERENCE TO RELATED APPLICATION

The present application is based on and claims the benefit of priority from earlier Japanese Patent Applications No. 2020-102143 filed on Jun. 12, 2020 and No. 2021-070064 filed on Apr. 19, 2021, the descriptions of which are incorporated herein by reference.

BACKGROUND

Technical Field

The present disclosure relates to a distance measurement device.

Related Art

A distance measurement device is known which emits pulsed light such as laser light from a light emitting unit and detects reflected light from an object by a light receiving unit, and measures a time of flight (TOF) of the light from emission to reception to detect presence or absence of the object and measure a distance to the object.

SUMMARY

An aspect of the present disclosure provides a distance measurement device. The distance measurement device includes: a light emitting unit that emits pulsed light; a light receiving unit that receives light including reflected light due to the pulsed light; and a calculation unit that uses a time of flight of the light received by the light receiving unit to calculate an object distance, which is a distance to an object that reflects the pulsed light and outputs the reflected light. The calculation unit includes: a histogram generation unit that generates a histogram representing received light intensity at the light receiving unit in each of a plurality of the times of flight; a composite peak portion estimation unit that estimates whether a composite peak portion is present in the histogram, the composite peak portion being a peak portion at which the received light intensity changes from an increasing state to a decreasing state with respect to the time of flight with reference to a peak time of flight and which is obtained from a combination of distributions of intensity of light from a plurality of objects, differences of distances to the objects from the distance measurement device being within a predetermined range; a time of flight specification unit that specifies two times of flight matching with first threshold received light intensity higher than received light intensity of noise light including background light, the two times of flight being rise time that is the shorter time of flight and fall time that is the longer time of flight; a base time of flight determination unit that, if it is estimated that the composite peak portion is present, determines a base time of flight that is a base for calculating the object distance based on the rise time or the fall time specified concerning the composite peak portion, and a distance calculation unit that uses the base time of flight to calculate a distance to one of the plurality of objects as the object distance.

The distance measurement device according to the aspect determines a base time of flight that is a base for calculating an object distance based on rise time or fall time specified concerning a composite peak portion, and uses the determined base time of flight to calculate the object distance.

Hence, even in a case in which time variations of received light intensity of reflected light from a plurality of objects are superimposed to form a shape such as a single peak, an object distance can be accurately measured.

DETAILED DESCRIPTION OF THE PREFERRED EMBODIMENTS

Figure 1:
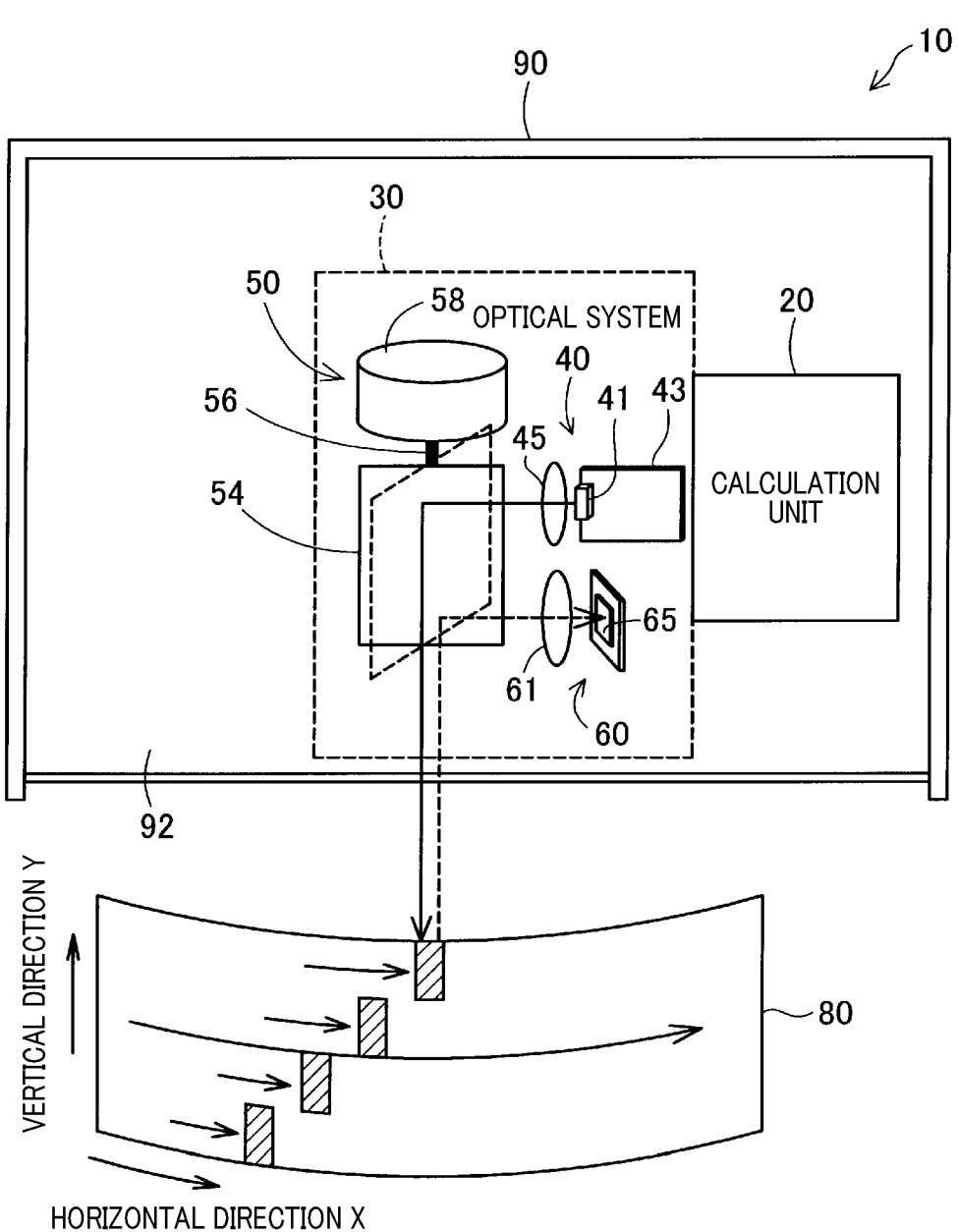
FIG. 1 is a diagram illustrating a schematic configuration of a distance measurement device as an embodiment of the present disclosure.

A distance measurement device is known which emits pulsed light such as laser light from a light emitting unit and detects reflected light from an object by a light receiving unit, and measures a time of flight (TOF) of the light from emission to reception to detect presence or absence of the object and measure a distance to the object. For such a distance measurement device, reflected light due to pulsed light being reflected by a window for emitting the pulsed light or the interior of a housing and reflected light due to pulsed light being reflected by rain or fog in a space between the distance measurement device and the object are called so-called clutter and may deteriorate measurement of a distance to the object. Specifically, the reflected light reflected due to the object and the clutter may be superimposed and detected as one received light pulse, whereby the time of flight cannot be correctly measured, which may lower accuracy in the measured distance. Hence, the distance measurement device disclosed in JP 2015-194356 A sets, as a threshold value for received light intensity, a value (High threshold value) larger than an amplitude value (intensity) of clutter and applies the High threshold value to received light intensity of a superimposed received light pulse to separate reflected waves (desired waves) reflected due to an object from the superimposed received light pulse, thereby improving accuracy in measuring a distance to the object.

For example, when clutter is due to fog, as the fog becomes thicker, the amplitude value of the clutter increases, and the difference in amplitude between the clutter and desired waves becomes smaller. For example, when clutter is due to a window for emitting pulsed light or a housing, as the reflectance of the window or the surface of the housing becomes higher, the amplitude of the clutter increases, and the difference in amplitude between the clutter and the desired waves becomes smaller. Thus, when the difference in amplitude between the clutter and the desired waves becomes smaller, a time variation of received light intensity of synthesized waves shows a shape such as a single peak. Such a phenomenon may occur not only in a case in which clutter is generated but also, for example, in a case in which a plurality of objects are present at different distances in the substantially same direction with reference to the distance measurement device, by the superimposition of reflected light from the plurality of objects. Thus, when received light intensity of reflected light from the plurality of objects is superimposed to form a shape such as a single peak, the distance measurement device in JP 2015-194356 A cannot separate desired waves from received light waves, whereby accuracy in distance measurement cannot be improved. In JP 2015-194356 A, for example, in a poor environment such as thick fog and heavy rain, distance measurement is not performed to suppress lowering of accuracy in distance measurement. However, as in the poor environment, even in a case in which time variations of received light intensity of reflected light from a plurality of objects are superimposed to form a shape such as a single peak, it is desired to be able to accurately perform distance measurement.

A. First Embodiment

A1. Device Configuration

A distance measurement device 10 illustrated in FIG. 1 includes an optical system 30 that emits pulsed light for distance measurement and receives reflected light from an external object and a calculation unit 20 that processes signals acquired from the optical system 30. The external object is also referred to as a reflecting object. The optical system 30 includes a light emitting unit 40 that emits laser light as pulsed light, a scanning unit 50 that scans a predetermined visual field region 80 with laser light, and a light receiving unit 60 for receiving incident light including reflected light from the external object and disturbance light. The distance measurement device 10 is accommodated in a housing 90 having a window 92 on the front surface thereof. The window 92 transmits most of pulsed light emitted from the light emitting unit 40 and reflects part of the pulsed light.

The distance measurement device 10 is, for example, an in-vehicle LiDAR (Laser Imaging Detection and Ranging) mounted to a vehicle such as an automobile. When the vehicle is traveling on a horizontal road surface, the lateral direction of the visual field region 80 agrees with the horizontal direction X, and the longitudinal direction agrees with the vertical direction Y.

The light emitting unit 40 includes a semiconductor laser element (hereinafter, also simply referred to as a laser element) 41 that emits laser light including pulsed light, a circuit board 43 in which a drive circuit for the laser element is incorporated, and a collimating lens 45 that converts the laser light emitted from the laser element 41 to parallel light. The laser element 41 is a laser diode that can produce a so-called short pulse laser. In the present embodiment, in the laser element 41, a plurality of laser diodes are arranged along the vertical direction to form a rectangular laser light emitting region. Intensity of laser light output from the laser element 41 can be adjusted depending on voltage supplied to the laser element 41.

The scanning unit 50 is configured by a so-called one-dimensional scanner. The scanning unit 50 is configured by a mirror 54, a rotary solenoid 58, and a rotor 56. The mirror 54 reflects the laser light which has been converted to parallel light by the collimating lens 45. The rotary solenoid 58 receives a control signal from the calculation unit 20 and repeatedly rotates in forward and reverse directions within a predetermined angular range. The rotor 56 is driven by the rotary solenoid 58 and repeatedly rotates in forward and reverse directions with a rotary shaft whose axial direction is the vertical direction to perform scanning with the mirror 54 in one direction along the horizontal direction. Laser light emitted from the laser element 41 through the collimating lens 45 is reflected by the mirror 54. The mirror 54 rotates to perform scanning with the reflected laser light along the horizontal direction. The visual field region 80 illustrated in FIG. 1 corresponds to the whole scanning region of the laser light. Since received light intensity can be acquired at each pixel position in the visual field region 80, the distribution of received light intensity in the visual field region 80 forms a kind of image. The scanning unit 50 may be omitted. In this case, the light emitting unit 40 may emit pulsed light to the whole visual field region 80, and the light receiving unit 60 may receive reflected light from the whole visual field region 80. In the present embodiment, pulsed light is emitted to each position in the scanning region, in other words, each pixel position in the visual field region 80. Then, an emission of the pulsed light and the distance measurement process described later based on reflected light from each pixel position are performed for each pixel position at predetermined time intervals.

The laser light output from the light emitting unit 40 is diffused from a surface of an external object (reflecting object) such as a person and a vehicle, and part of the laser light returns to the mirror 54 of the scanning unit 50 as reflected light. The reflected light is reflected by the mirror 54 and enters a light receiving lens 61 of the light receiving unit 60 as incident light together with disturbance light. Then, the reflected light is collected by the light receiving lens 61 and enters a light receiving array 65. The laser light output from the distance measurement device 10 is diffused from not only an external object but also an object in the distance measurement device 10, for example, the window 92, and part of reflected light due to the laser light enters the light receiving array 65.

Figure 2:
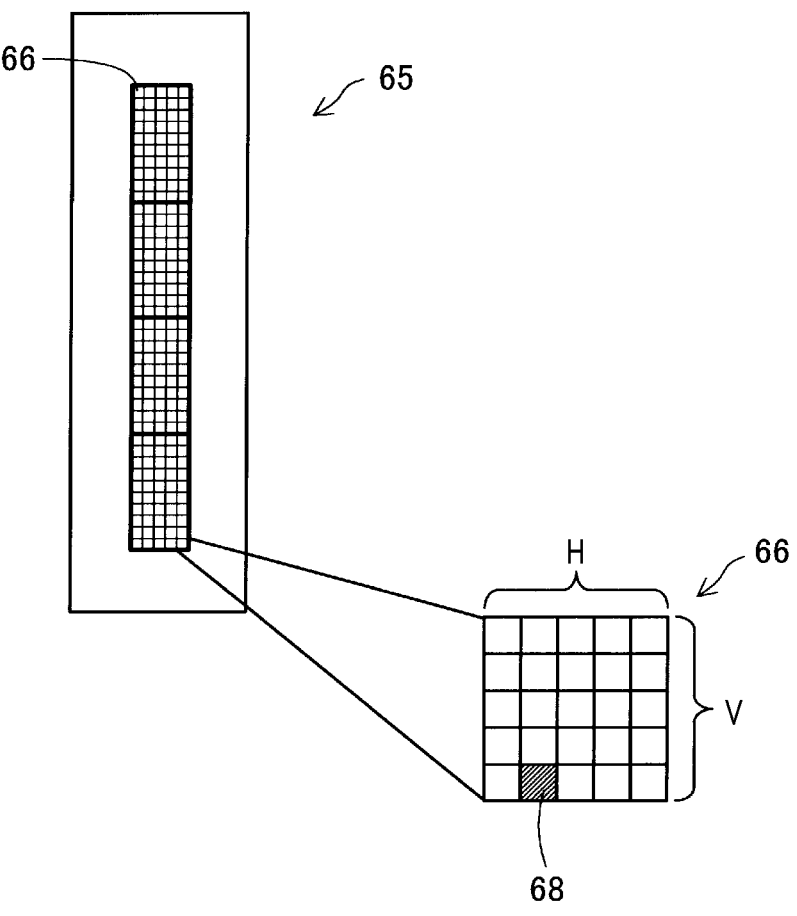
FIG. 2 is an explanatory diagram illustrating a schematic configuration of a light receiving array.

As illustrated in FIG. 2, the light receiving array 65 is configured by a plurality of two-dimensionally arranged pixels 66. One pixel 66 is configured by a plurality of SPAD (Single Photon Avalanche Diode) circuits 68 arranged so that H of the SPADs are arrayed in the horizontal direction and V of the SPADs are arrayed in the vertical direction. H and V are integers of 1 or more. In the present embodiment, H=V=5, whereby five SPAD circuits 68 are provided in each of the horizontal and vertical directions. The pixel 66 can be configured by any number of SPAD circuits 68 and may be configured by one SPAD circuit 68. As a result of light reception by one pixel 66, received light intensity at one pixel position in the visual field region 80 is obtained.

Figure 3:
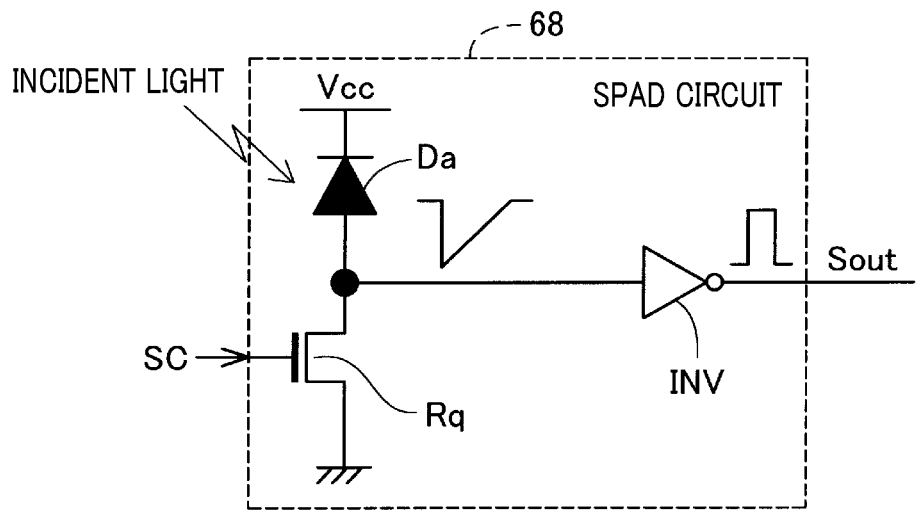
FIG. 3 is a circuit diagram illustrating a schematic configuration of an SPAD circuit.

As illustrated in FIG. 3, in the SPAD circuit 68, an avalanche diode Da and a quench resistor Rq are connected in series between a power source Vcc and a ground line. Voltage at the connection point is input to an inversion element INV, which is a logical operation element, and is converted to a digital signal whose voltage level is inverted. An output signal Sout of the inversion element INV is externally output without change. In the present embodiment, the quench resistor Rq is configured as a FET. If a selection signal SC is active, the on-resistance serves as the quench resistor Rq. If the selection signal SC is non-active, the quench resistor Rq is in a high impedance state. Hence, even when light enters the avalanche diode Da, no quench current flows. As a result, the SPAD circuit 68 does not operate. The selection signals SC are collectively output to the 5*5 SPAD circuits 68 in the pixel 66 and are used to specify whether to read a signal from each pixel 66. In the present embodiment, although the avalanche diode Da is operated in a Geiger mode, the avalanche diode Da may be used in a linear mode to handle the output thereof as an analog signal without change. Alternatively, instead of the avalanche diode Da, a PIN photodiode may be used.

If no light has been entered the SPAD circuit 68, the avalanche diode Da is kept in a non-conductive state. Hence, the input side of the inversion element INV is kept in a pull-up state via the quench resistor Rq, that is, at a high level H. Hence, output of the inversion element INV is kept at a low level L. If light externally enters each SPAD circuit 68, the avalanche diode Da becomes a conductive state due to incident photons. As a result, a large current flows through the quench resistor Rq, whereby the input side of the inversion element INV becomes a low level L once, and output of the inversion element INV is inverted to a high level L. Flow of large current through the quench resistor Rq results in lowering the voltage applied to the avalanche diode Da. Hence, power supply to the avalanche diode Da stops, whereby the avalanche diode Da returns to the non-conductive state. As a result, the output signal of the inversion element INV is also inverted and returns to a low level L. Accordingly, if photons enter each SPAD circuit 68, the inversion element INV outputs a pulse signal, which becomes a high level, for an extremely short time. Hence, if the selection signal SC is set at a high level H at the timing at which each SPAD circuit 68 receives light, an output signal of the inversion element INV, that is, an output signal Sout from each SPAD circuit 68 becomes a digital signal reflecting the state of the avalanche diode Da.

Figure 4:
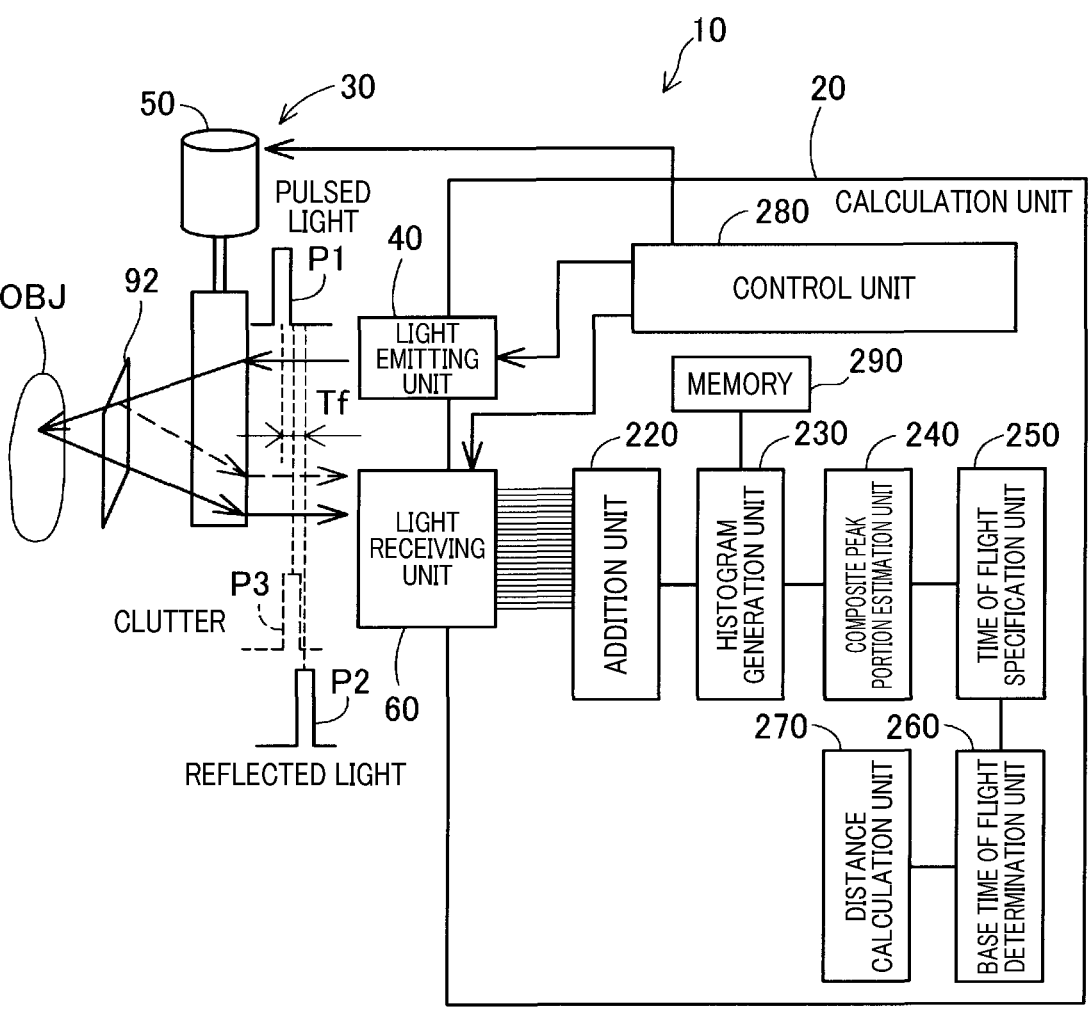
FIG. 4 is a block diagram illustrating a functional configuration of the distance measurement device of a first embodiment.

The output signal Sout corresponds to a pulse signal generated due to reception of incident light including reflected light, which is irradiation light that is reflected by an external object present in the scanning region, the window 92, or the like and is returned, and disturbance light. The calculation unit 20 uses a time of flight (time-of-flight) of reflected light received by the light receiving unit 60 to calculate a distance (hereinafter, referred to as an object distance) to an object that reflects pulsed light to output the reflected light. A calculation method of the distance will be briefly described below. As illustrated in FIG. 4, pulsed light P1 emitted from the light emitting unit 40 is reflected by a reflecting object OBJ, which is an external object. In other words, the reflecting object OBJ outputs reflected light P2 of the pulsed light P1. Also on the inner surface of the window 92, the pulsed light P1 is reflected, and reflected light P3 is output. As a result, the reflected light P2, P3 reaches the light receiving unit 60. At this time, the time period from the emission of the pulsed light P1 to the reception of reflected light P2, P3 is specified as a time of flight Tf of light. The calculation unit 20 uses the time of flight Tf to calculate a distance from the distance measurement device 10 (the light emitting unit 40 and the light receiving unit 60) to the reflecting object OBJ. Reflected light, which is acquired after the pulsed light P1 is reflected by the inner surface of the window 92, and light, which is received by the light receiving unit 60 after the reflected light is reflected by the interior of the housing of the distance measurement device 10 several times, are also referred to as clutter.

As illustrated in FIG. 4, the calculation unit 20 includes the calculation unit 20, an addition unit 220, a histogram generation unit 230, a composite peak portion estimation unit 240, a time of flight (time-of-flight) specification unit 250, a base time of flight (base time-of-flight) determination unit 260, a distance calculation unit 270, a control unit 280, and a memory 290.

The addition unit 220 adds outputs of the SPAD circuits 68 included in the pixel 66 configuring the light receiving array 65. If incident pulsed light enters one pixel 66, the SPAD circuits 68 included in the pixel 66 operates. The SPAD circuit 68 can detect one photon when it enters the SPAD circuit 68. However, the SPAD circuit 68 should stochastically detect limited light output from the reflecting object OBJ. Hence, the addition unit 220 adds the output signals Sout from the SPAD circuits 68, which cannot detect light stochastically entering the SPAD circuits 68, the number of the output signals Sout being the number of all the SPAD circuits 68 included in each pixel 66, whereby the addition unit 220 can more reliably detect reflected light from the reflecting object OBJ in each pixel 66.

The histogram generation unit 230 acquires addition results of the addition unit 220 in time series to generate a histogram of received light intensity and stores it in the memory 290. The histogram generated by the histogram generation unit 230 corresponds to a graph representing received light intensity in each of the times of flight. The received light intensity is the number of the SPAD circuits 68 that have received light in one pixel 66.

The composite peak portion estimation unit 240 estimates whether a composite peak portion is present in the histogram generated by the histogram generation unit 230. The composite peak portion means a peak portion at which the received light intensity changes from an increasing state to a decreasing state with respect to the time of flight with reference to a peak time of flight and which can be acquired from a combination of distributions of intensity of light from a plurality of objects, the differences of distances to the objects from the distance measurement device 10 being within a predetermined range.

Figure 5:
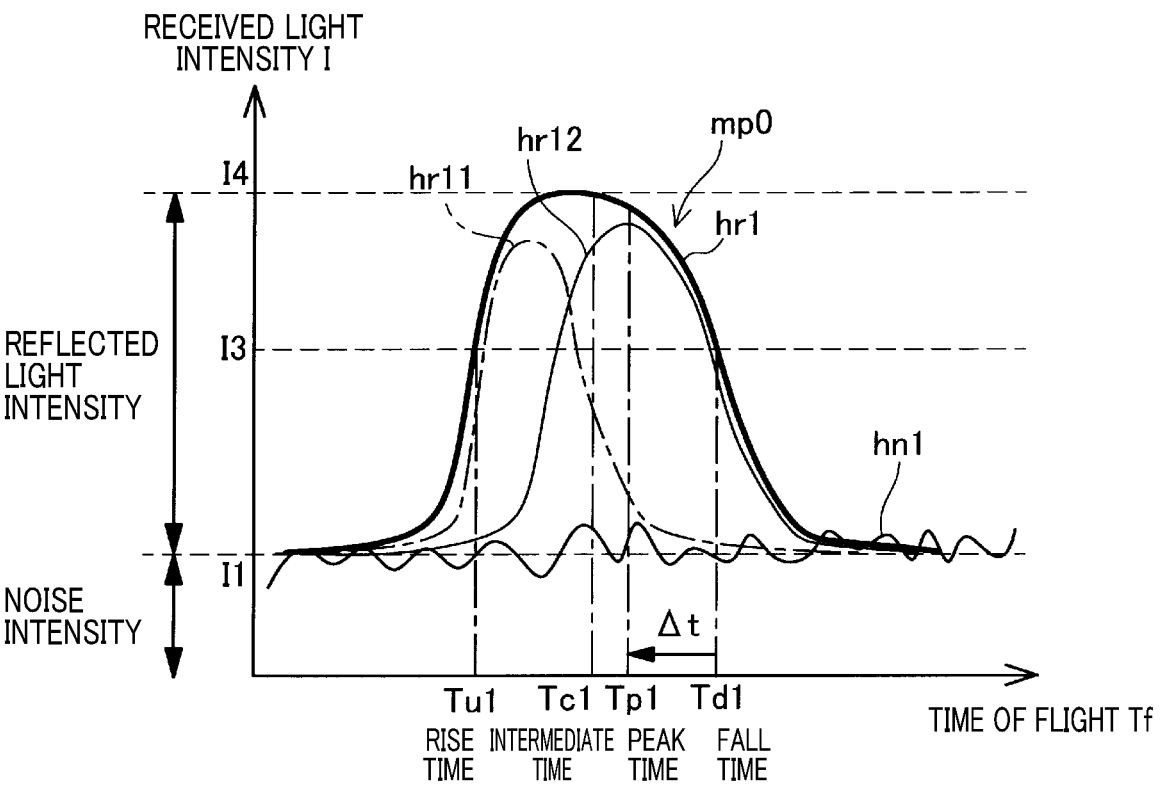
FIG. 5 is an explanatory diagram illustrating an example of a histogram having a composite peak portion.

In FIG. 5, the horizontal axis indicates a time of flight Tf, and the vertical axis indicates received light intensity I. A histogram hr1 represented by a thick solid line in FIG. 5 is acquired by combing a histogram hr11 of received light intensity due to clutter represented by a thin alternate long and short dash line and a histogram hr12 of received light intensity of reflected light due to an object outside the distance measurement device 10 represented by a thin solid line. Each of the histograms illustrated in FIG. 5 is in a case in which the object outside the distance measurement device 10 is located in the vicinity of the distance measurement device 10 (window 92). In an example illustrated in FIG. 5, a composite peak portion mp0 appears in the histogram hr1. The histogram hr11 and the histogram hr12 temporally overlap with each other. Received light intensity (degree) of the peak of the histogram hr11 and received light intensity (degree) of the peak of the histogram hr12 are substantially equal to each other. As illustrated in FIG. 5, the composite peak portion mp0 appears so as to have a shape such as a single peak. When the time period between rise time and fall time of a peak portion, in other words, the time period during which received light intensity is equal to or more than a first threshold value described later is equal to or more than a predetermined time period, the composite peak portion estimation unit 240 estimates that a composite peak portion is present in the histogram. Values of the received light intensity I illustrated in FIG. 5, that is, noise intensity I1, a first threshold received light intensity I3, and peak intensity I4 will be described later in detail. Values of times of flight Tf illustrated FIG. 5, that is, rise time Tu1, fall time Td1, peak time Tp1, and an intermediate time Tc1 will be described later in detail.

The time of flight specification unit 250 specifies two times of flight (rise time and fall time described later), at which received light intensity agrees with the first threshold received light intensity, in the histogram generated by the histogram generation unit 230. The first threshold received light intensity is a threshold value of received light intensity that is used when an object distance is calculated and is used for determining rise time and fall time of a peak portion of the histogram. In the example illustrated in FIG. 5, the first threshold received light intensity I3 is set. In the present embodiment, the first threshold received light intensity is set as a value represented by the following expression (1).

$$\text{First threshold received light intensity} = (\text{peak intensity} - \text{noise intensity}) * 0.4 + \text{noise intensity} \quad (1)$$

The peak intensity means the maximum received light intensity of a peak portion, which corresponds to the peak intensity I4 in the composite peak portion mp0 in FIG. 5. The noise intensity means received light intensity of light (hereinafter, referred to as noise light) other than reflected light due to pulsed light. Such noise light includes background light such as sunlight, reflected light that is sunlight reflected by an external object, light of a street lamp, and the like. The noise intensity can be determined as an average value of received light intensity for a predetermined time period measured at the timing at which the light emitting unit 40 is not emitting pulsed light. In the expression (1), (peak intensity - noise intensity) is also referred to as reflected light intensity. In the expression (1), the received light intensity obtained by adding a value, which is 40 percent of reflected light intensity, to noise intensity is set as the first threshold received light intensity. Instead of 40 percent, any percentage less than or more than 40 percent may be used. In the example illustrated in FIG. 5, at two times Tu1, Td1, the histogram hr1 matches with the first threshold received light intensity I3. The time of flight specification unit 250 specifies time Tu1, which is earlier than Td1, as the rise time Tu1, and specifies time Td1, which is later than Tu1, as the fall time Td1.

The base time of flight determination unit 260 determines time of flight that is the base for calculating the object distance (hereinafter, referred to as a base time of flight (base time-of-flight)). In the present embodiment, as described below, the base time of flight determination unit 260 determines the fall time as the base time of flight. The reason for determining the fall time as the base time of flight will be described later.

The distance calculation unit 270 uses the base time of flight determined by the base time of flight determination unit 260 to calculate an object distance. The method of calculating the object distance will be described later in detail. For example, in the vehicle in which the distance measurement device 10 is installed, the calculated object distance may be used for a process for estimating whether a collision with an object will occur, and control of steering and braking for avoiding a collision.

Figure 6:
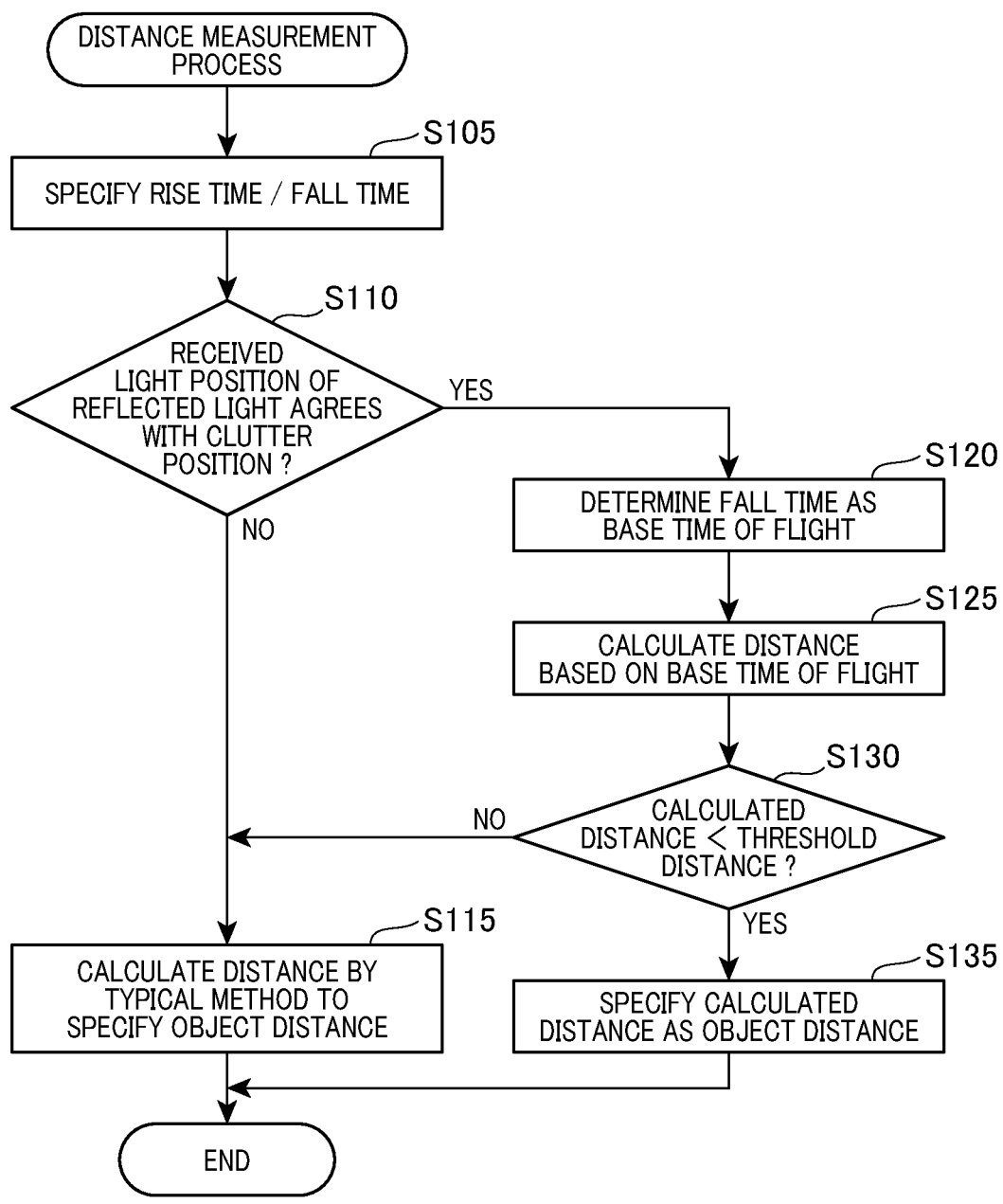
FIG. 6 is a flowchart illustrating a procedure of a distance measurement process according to the first embodiment.

A2. Distance Measurement Process:

The distance measurement process illustrated in FIG. 6 is periodically performed at predetermined intervals for each pixel position. At the timing after the light emitting unit 40 emits pulsed light, the light receiving unit 60 receives reflected light due to the pulsed light, and the histogram generation unit 230 generates a histogram, the distance measurement process is started.

The composite peak portion estimation unit 240 specifies a composite peak portion in the generated histogram. The time of flight specification unit 250 specifies rise time and fall time (step S105). Specifically, the composite peak portion estimation unit 240 specifies, in the histogram, a portion in which time of flight, at which received light intensity exceeds the first threshold received light intensity, continues for a predetermined time period or more to specify a composite peak portion. The time of flight specification unit 250 specifies two times of flight matching with the first threshold received light intensity in the composite peak portion as rise time and fall time.

For example, in the example illustrated in FIG. 5, the composite peak portion mp0 is specified. At two times Tu1, Td1, the composite peak portion mp0 matches with the first threshold value received light intensity I3. The time Tu1, which is earlier than Td1, is specified as the rise time Tu1. Time Td1, which is later than Tu1, is specified as the fall time Td1.

As illustrated in FIG. 6, the base time of flight determination unit 260 determines whether the received light position of reflected light agrees with the position of clutter (step S110). Clutter, that is, reflected light due to pulsed light being reflected by the window 92 and an inner wall of the housing enters the light receiving unit 60 always from the same position (direction). The distances to the window 92 and the inner wall of the housing are constant. Thus, the direction of the pixel position, at which reflected light due to pulsed light being reflected by the window 92 or the inner wall of the housing is specified, and the extent of the time of flight at which the reflected light is specified can be previously specified by experiment or simulation. Hence, in the present embodiment, the pixel positions and the times of flight of reflected light due to pulsed light being reflected by the window 92 and the inner wall of the housing are previously stored in the memory 290. It is determined whether the pixel position at which a composite peak portion has been detected and the time of flight of the composite peak portion agree with the pixel position and the time of flight stored in the memory 290 to determine whether the received light position of the reflected light agrees with the position of clutter.

If it is determined that the received light position of the reflected light does not agree with the position of clutter (step S110: NO), the distance calculation unit 270 calculates a distance by a typical method to specify the distance as an object distance (step S115). The method for distance measurement in step S115 will be described with reference to FIG. 7.

Figure 7:
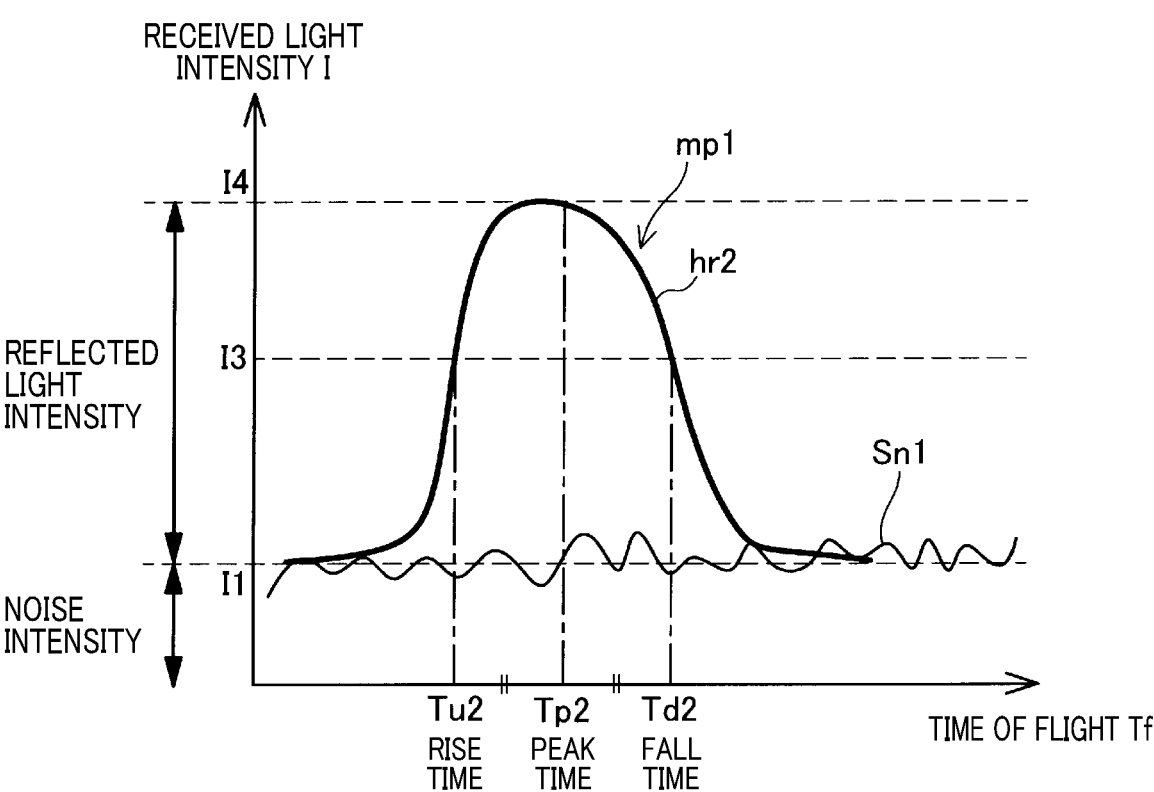
FIG. 7 is an explanatory diagram illustrating an example of a histogram not having a composite peak portion.

Since the vertical axis and the horizontal axis in FIG. 7 are the same as those in FIG. 5, the detailed descriptions thereof are omitted. A peak portion mp1 illustrated in FIG. 7 may be generated in such a case that an object is present outside the distance measurement device 10 in the direction different from that in which clutter is generated and the light receiving unit 60 has received reflected light due to pulsed light from the object. In this case, since the pixel position (direction) of the peak portion mp1 differs from (does not include) the position of the clutter, the time of flight specification unit 250 specifies an intermediate time between rise time Tut and fall time Td2 as the peak time Tp2 of the peak portion mp1. Then, the base time of flight determination unit 260 determines the peak time Tp2 as a base time of flight. The distance calculation unit 270 uses the peak time Tp2 to determine distances from the distance measurement device 10 to the plurality of objects.

As illustrated in FIG. 6, if it is determined that the received light position of the reflected light agrees with the position of clutter (step S110: YES), the base time of flight determination unit 260 determines the fall time specified in step S105 as base time of flight (step S120). The distance calculation unit 270 calculates a distance based on the base time of flight determined in step S120 (step S125). Specifically, for example, if it is determined that the fall time Td1 of the composite peak portion mp0 illustrated in FIG. 5 is determined as base time of flight, the distance calculation unit 270 specifies the time Tp1, which is earlier than the fall time Td1 by a predetermined time Δt, as the peak time Tp1. The distance calculation unit 270 uses the peak time Tp1 to calculate an object distance. More specifically, the object distance is calculated assuming that the peak time Tp1 is the time of flight Tf of pulsed light and reflected light thereof.

As illustrated in FIG. 5, the time (peak time Tp1) earlier than the time Td1 by the time Δt substantially agrees with the peak time of the histogram hr12. In contrast, the intermediate time Tc1 between the rise time Tu1 and the fall time Td1 is greatly displaced from the peak time of the histogram hr1. Hence, it is found that calculating a distance assuming that the peak time Tp1 is the base time of flight as described above can calculate the distance to the object corresponding to the histogram hr1 more accurately than calculating a distance by a typical method. As described above, the reason for the large displacement of the intermediate time Tc1 from the peak time of the histogram hr1 will be described. Since the composite peak portion mp0 is generated by combing the histogram hr12 due to received light output from the farther reflecting object OBJ and the histogram hr11 due to clutter output from the nearer window 92, the rise position Tu1 of the composite peak portion mp0 substantially agrees with the rise position of the histogram hr11 having an earlier peak position. The fall position of the histogram hr11 substantially agree with the fall position of the histogram hr12 due to reflected light from the farther (longer time of flight) object. In contrast, the fall position of the earlier histogram hr11 is greatly displaced from the fall position of the histogram hr1, due to the presence of the later histogram hr12. Similarly, the rise position of the later histogram hr12 is greatly displaced from the rise position of the histogram hr1, due to the presence of the earlier histogram hr11. Hence, even if the intermediate time Tc1 between the rise time Tu1 and the fall time Td1 is specified to calculate an object distance according to a typical method, the intermediate time Tc1 is greatly different and displaced from the peak time of the histogram hr11 and the peak time of the histogram hr12. In contrast, with reference to the fall time of the histogram hr1 that substantially agrees with the fall time of an object, the time earlier than the fall time by time Δt is set as base time of flight, whereby the substantially same distance as the distance calculated when the peak time of the object is set as base time of flight can be determined.

As illustrated in FIG. 6, the distance calculation unit 270 determines whether the distance calculated in step S125 is shorter than a predetermined threshold distance (step S130). If the calculated distance is the threshold distance in step S130 or longer, it is confirmed that clutter is not generated. The threshold distance in step S130 is set as a value obtained by adding a predetermined value to distances from the light emitting unit 40 and the light receiving unit 60 to the window 92. Step S130 is performed to confirm that the received reflected light is reliably not due to clutter when the distance calculated based on the base time of flight is longer than the distance calculated in a case in which clutter is generated.

If it is determined that the distance calculated in step S125 is not shorter than the threshold distance (step S130: NO), the above step S115 is performed to calculate the object distance by a typical method. In contrast, if it is determined that the distance calculated in step S120 is shorter than the threshold distance (step S130: YES), the distance calculation unit 270 specifies the distance calculated in step S125 as the object distance (step S135). After the completion of the above step S115 or step S135, the distance measurement process at the concerned pixel position ends, and the distance measurement is started for a next pixel position.

According to the distance measurement device 10 of the first embodiment described above, if it is estimated that a composite peak portion is present which includes clutter, which is reflected light due to pulsed light being reflected by the window 92, an inner wall of the housing, or the like, a base time of flight is determined based on fall time. Hence, when clutter is generated, an object distance can be measured with high accuracy. Typically, the time of flight of the reflected light due to pulsed light being reflected by the window 92 or the interior of the housing is shorter than that of an object present outside the distance measurement device. In other words, the time of flight of the reflected light due to pulsed light being reflected by the object present outside the distance measurement device is longer than that of the reflected light due to pulsed light being reflected by the interior of the housing. Hence, the error between the fall position (time) of the composite peak portion and the fall position (time) of the reflected light due to pulsed light being reflected by the object present outside the distance measurement device is small. Hence, according to the distance measurement device 10 of the present embodiment, the accuracy in distance measurement can be improved when it is estimated that a composite peak portion is present.

When there is no clutter, the intermediate time between rise time and fall time is determined as a base time of flight. Hence, compared with a case in which when there is no clutter, the base time of flight is determined based on one of the rise time and the fall time, an object distance can be measured with higher accuracy. One reason is that even when an error is caused when each of the rise time and the fall time is specified, since the intermediate time between the rise time and the fall time is used, influence of the error can be suppressed compared with a case in which a base time of flight is determined with reference to only one of the rise time and the fall time.

B. Second Embodiment

Figure 8:
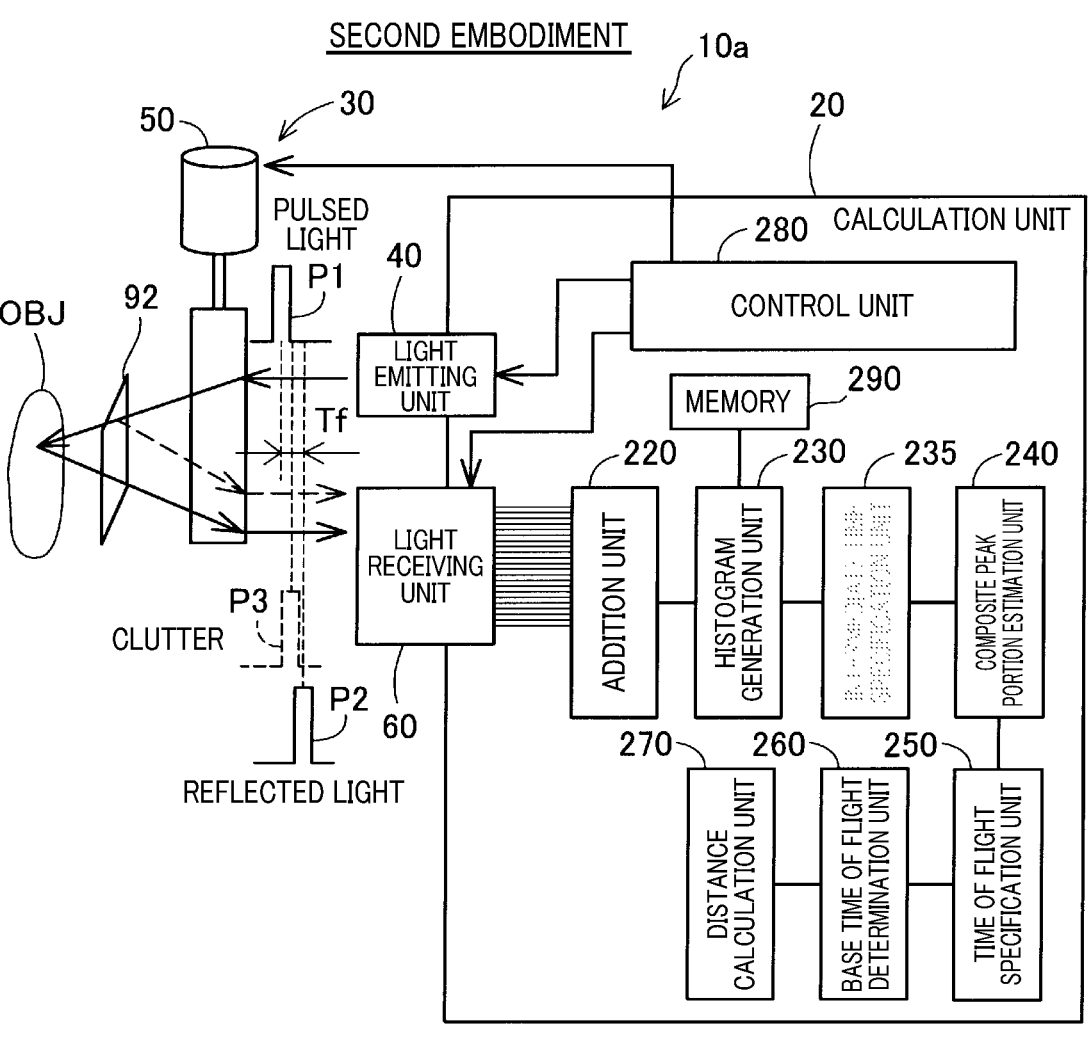
FIG. 8 is a block diagram illustrating a functional configuration of a distance measurement device of a second embodiment.

The configuration of a distance measurement device 10a of the second embodiment illustrated in FIG. 8 differs from the configuration of the distance measurement device 10 of the first embodiment in that the calculation unit 20 additionally includes an intermediate time specification unit 235. Since other configurations of the distance measurement device 10a are the same as those of the distance measurement device 10 of the first embodiment, the same components are denoted by the same reference numerals to omit the detailed descriptions.

The intermediate time specification unit 235 specifies, in a composite peak portion, an intermediate time between two times of flight that match with the first threshold received light intensity (hereinafter, referred to as first intermediate time) and an intermediate time between two times of flight that match with the second threshold received light intensity (hereinafter, referred to as a second intermediate time). The first threshold received light intensity of the second embodiment is the same as the first threshold received light intensity of the first embodiment. The second threshold received light intensity is lower than the first threshold received light intensity and is higher than noise intensity. Specifically, in the present embodiment, the second threshold received light intensity is set as a value represented by the following expression (2).

$$\text{Second threshold received light intensity} = (\text{peak intensity} - \text{noise intensity}) * 0.1 + \text{noise intensity} \quad (2)$$

Figure 9:
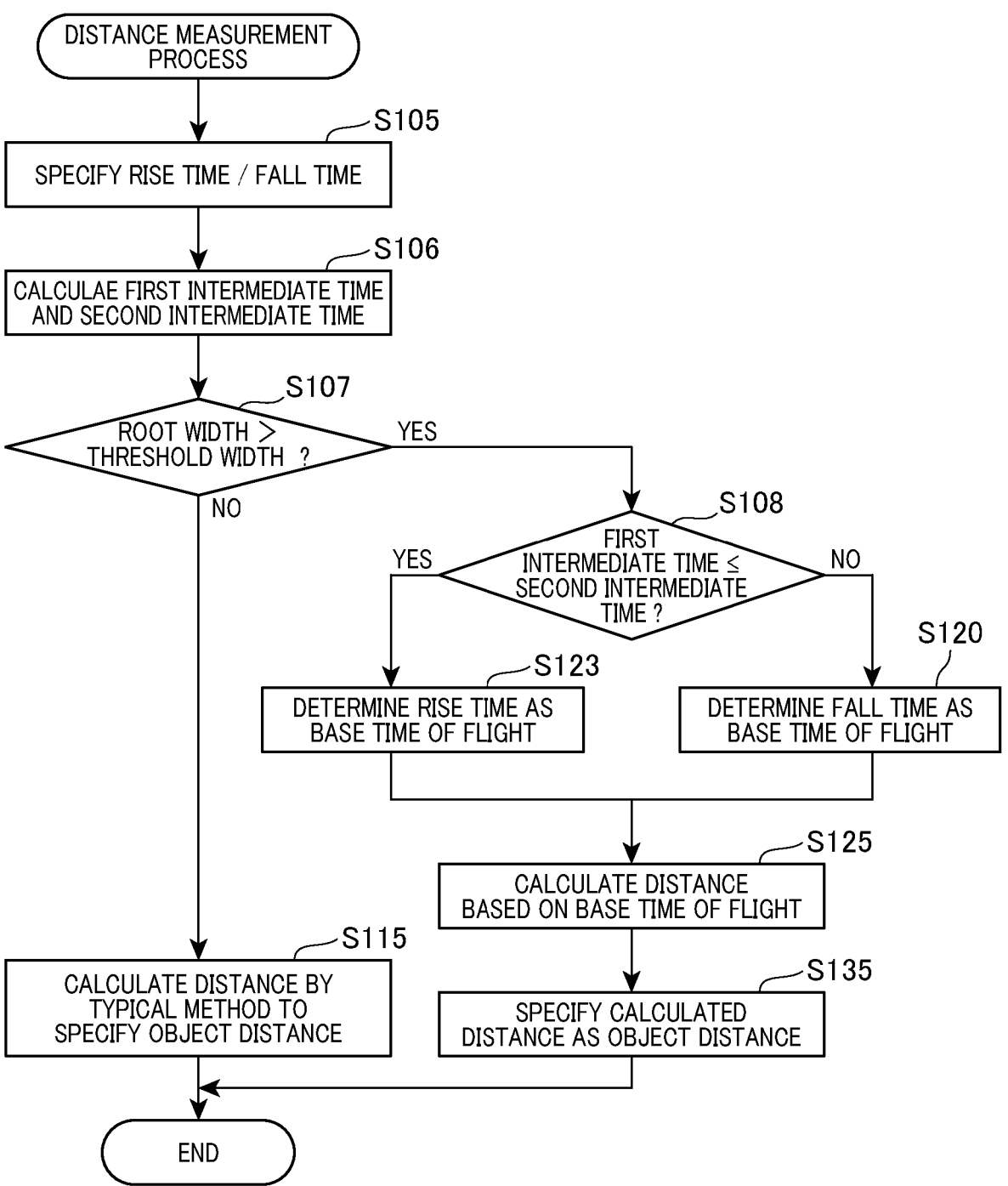
FIG. 9 is a flowchart illustrating a procedure of a distance measurement process according to the second embodiment.

The distance measurement process of the second embodiment illustrated in FIG. 9 differs from the distance measurement process of the first embodiment illustrated in FIG. 6 in that step S110 is omitted and steps S106, S107, S108, and S123 are added and performed. Since other procedures of the distance measurement process of the second embodiment are the same as those of the distance measurement process of the first embodiment, the same procedures are denoted by the same reference numerals to omit the detailed descriptions.

After the completion of step S105, the intermediate time specification unit 235 calculates the first intermediate time and the second intermediate time (step S106).

Figure 10:
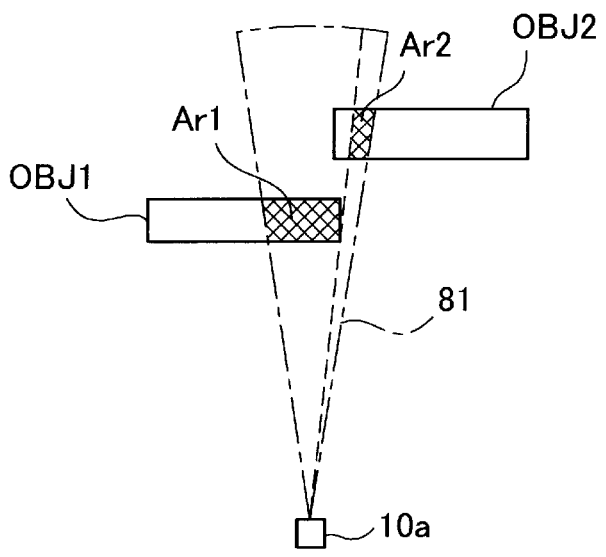
FIG. 10 is a plan view illustrating a schematic positional relationship between a plurality of objects and the distance measurement device according to the second embodiment.

As illustrated in FIG. 10, when two objects OBJ1, OBJ2 are present at a pixel position 81, and the objects OBJ1, OBJ2 respectively have regions Ar1, Ar2 exposed when viewed from the distance measurement device 10a, reflected light output from the two regions Ar1, Ar2 enters the light receiving unit 60 of the distance measurement device 10a. In an example illustrated in FIG. 10, the object OBJ1 is located on the near side when viewed from the distance measurement device 10a, and the object OBJ2 is located on the far side when viewed from the distance measurement device 10a. At the pixel position 81, an exposed area of the region Ar1 viewed from the distance measurement device 10a is larger than an exposed area of the region Ar2. A histogram generated in such a state will be described with reference to FIG. 11.

Figure 11:
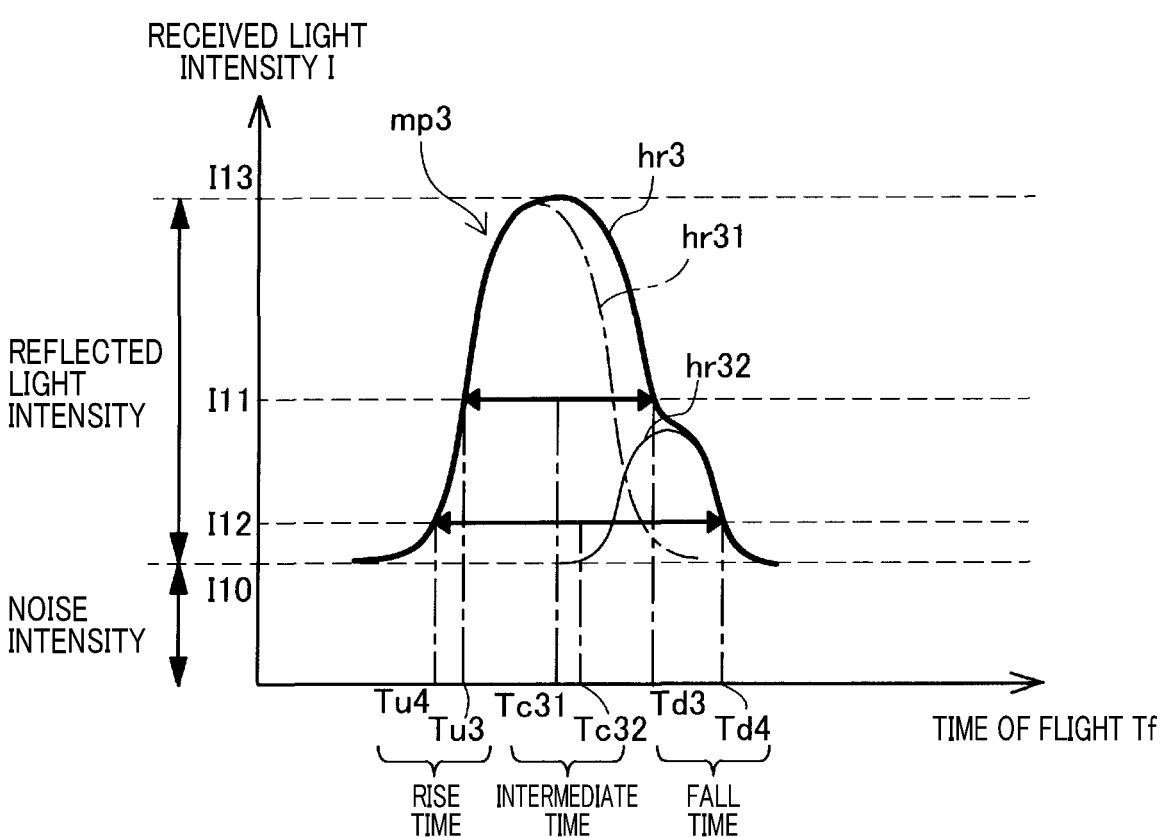
FIG. 11 is an explanatory diagram illustrating an example of a histogram having a composite peak portion according to the second embodiment.

Since the vertical axis and the horizontal axis in FIG. 11 are the same as those in FIG. 5, the detailed descriptions thereof are omitted. A histogram hr3 generated in the state in FIG. 10 has a composite peak portion mp3 generated by a combination of a large peak portion and a small peak portion having a peak located later than that of the large peak portion. Specifically, the composite peak portion mp3 corresponds to a peak portion of the histogram hr3 acquired by combing a histogram hr31 due to reflected light from the area Ar1 represented by a thin alternate long and short dash line and a histogram hr32 due to reflected light from the area Ar2 represented by a thin solid line. As described above, the area Ar1 is located on the nearer side and has a larger exposed area. In contrast, the area Ar2 is located on the farther side and has a mall exposed area. Hence, the peak portion of the histogram hr31 is located earlier than the peak portion of the histogram hr32 and has high peak received light intensity. Hence, the composite peak portion mp3 has a distorted peak shape having a relatively high peak at temporally early position and a relatively low peak at temporally later position.

For the composite peak portion mp3 having such a shape, in the above step S106, the intermediate time specification unit 235 specifies, for the composite peak portion mp3, two times (rise time Tu3 and fall time Td3) matching with first threshold received light intensity Il1 to specify an intermediate time Tc31 between the two times. The intermediate time specification unit 235 specifies, for the composite peak portion mp3, two times (rise time Tu4 and fall time Td4) matching with second threshold received light intensity Il2 to specify an intermediate time Tc32 between the two times. In the present embodiment, the intermediate time between two times matching with the first threshold received light intensity is referred to as a first intermediate time. The intermediate time between two times matching with the second threshold received light intensity is referred to as a second intermediate time. Hence, the intermediate time Tc31 is also referred to as a first intermediate time Tc31, and the intermediate time Tc32 is also referred to as a second intermediate time Tc32.

As illustrated in FIG. 9, the composite peak portion estimation unit 240 determines whether a width between two times matching with the second threshold received light intensity (hereinafter, referred to as a root width) is larger than a threshold width (step S107). In an example illustrated in FIG. 11, in the composite peak portion mp3, the width between the two times Tu4 and Td4 matching with the second threshold received light intensity Il2 corresponds to a root width dt31. As in the composite peak portion mp3, the composite peak portion acquired by combing peak portions included in a histogram of reflected light from a plurality of objects has a large root width. In contrast, the root width of a peak portion due to reflected light from a single object is small. Hence, a threshold width for specifying a composite peak portion is previously specified by experiment and set. If it is determined that the root width is not larger than the threshold width as illustrated in FIG. 9 (step S107: NO), the above step S115 is performed. In this case, since reflected light from the single object has been received, a distance is calculated by a typical method to specify an object distance.

If it is determined the root width is larger than the threshold width (step S107: YES), the peak portion is highly likely to be a composite peak portion. In this case, the base time of flight determination unit 260 determines whether the first intermediate time is the second intermediate time or earlier (step S108).

In the example illustrated in FIG. 11, the first intermediate time Tc31 is earlier than the second intermediate time Tc32. In an example illustrated in FIG. 13, the first intermediate time agrees with the second intermediate time. A histogram hr5 illustrated in FIG. 3 is acquired by combining a histogram hr51 and a histogram hr52. The histogram hr51 is due to reflected light from the object OBJ1 illustrated in FIG. 10. The histogram hr52 is due to reflected light from the object OBJ2 illustrated in FIG. 10. However, the example illustrated in FIG. 13 differs from the example illustrated in FIG. 10 in that, at the pixel position 81, an exposed area of the region Ar1 viewed from the distance measurement device 10a is equal to an exposed area of the region Art. In such a case, peak received light intensity of the histogram hr51 due to reflected light from the object OBJ1 is equal to peak received light intensity of the histogram hr52 due to reflected light from the object OBJ2. Hence, a composite peak portion mp5 has a peak having a single large peak shape. In this example, both of the first intermediate time and the second intermediate time are an intermediate time Tc51.

Figure 13:
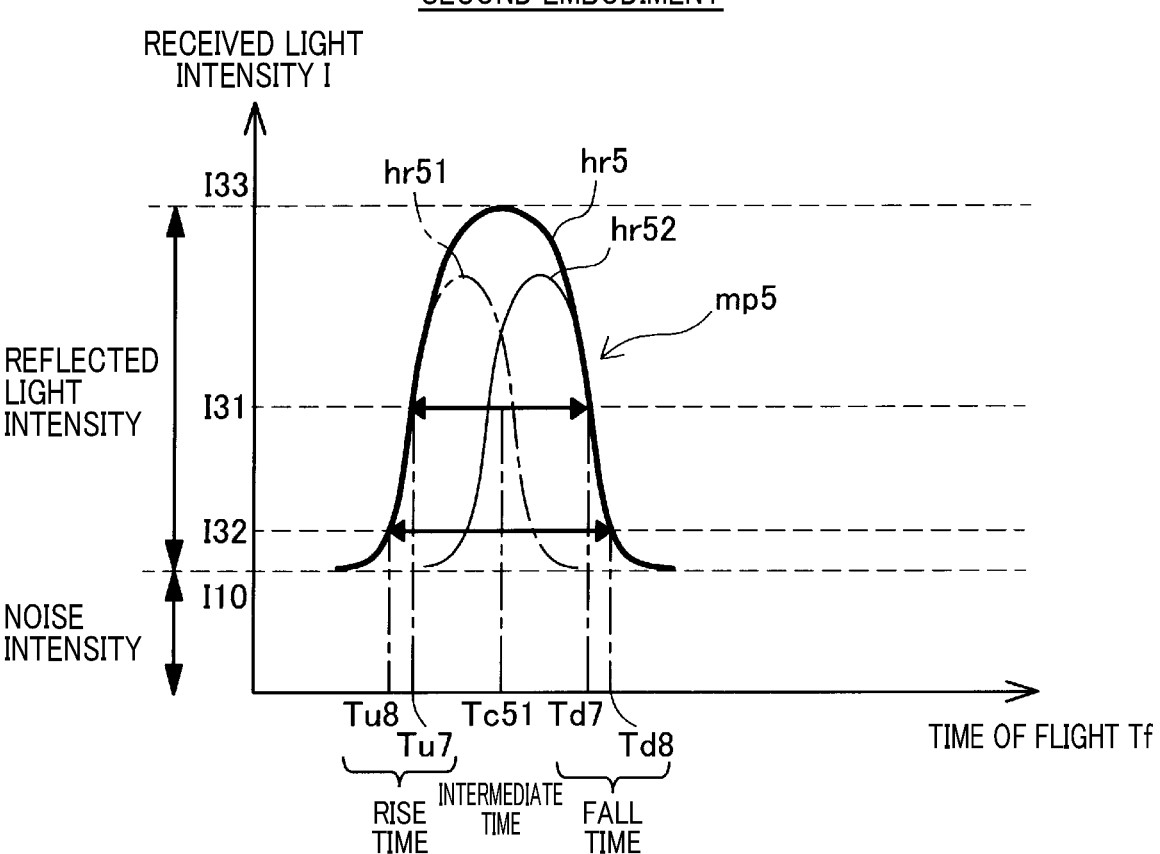
FIG. 13 is an explanatory diagram illustrating an example of a histogram having a composite peak portion according to the second embodiment.

In the examples illustrated in FIG. 11 and FIG. 13, in step S108, it is determined that the first intermediate time Tc31 is earlier than the second intermediate time Tc32. Thus, if the first intermediate time Tc31 is determined to be earlier than the second intermediate time Tc32 (step S108: YES), the base time of flight determination unit 260 determines the rise time specified in step S105 as base time of flight (S123). For example, in the example illustrated in FIG. 11, the rise time Tu3 is determined as a base time of flight. In the example illustrated in FIG. 13, the rise time Tu7 is determined as a base time of flight.

Figure 12:
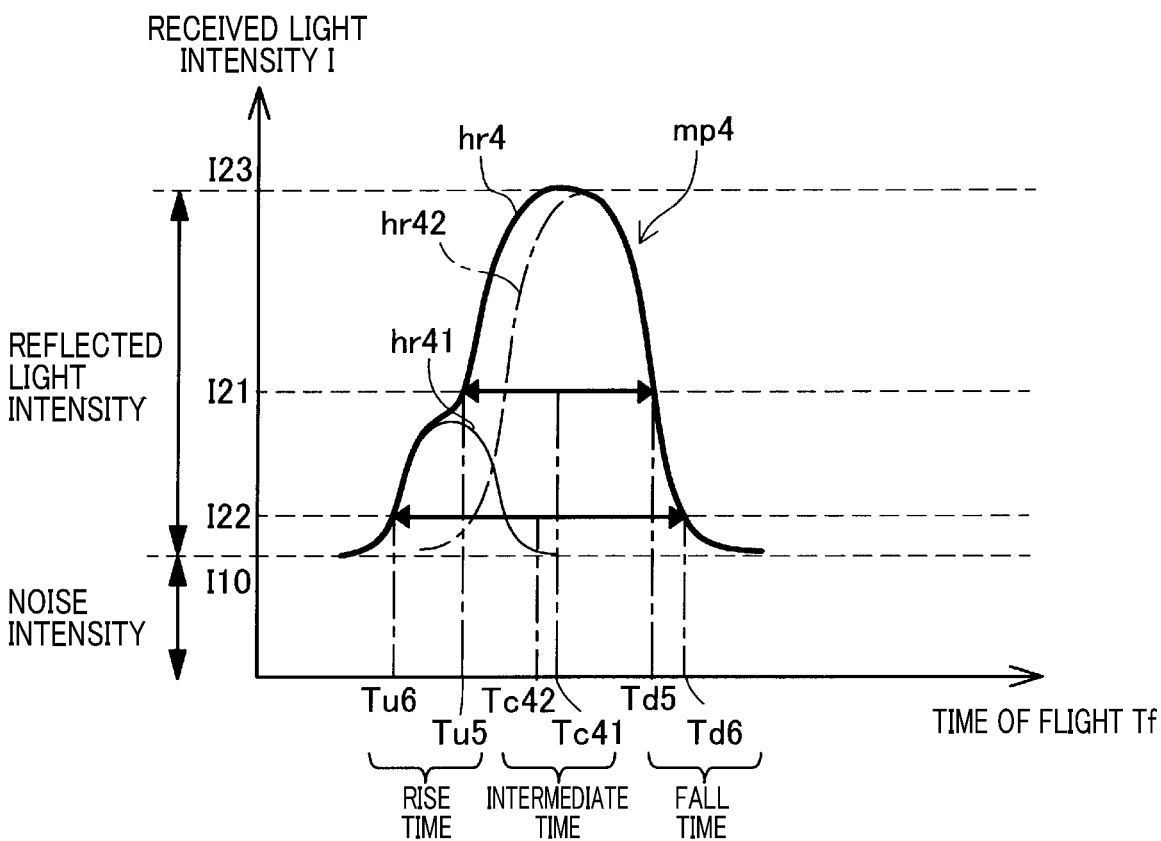
FIG. 12 is an explanatory diagram illustrating an example of a histogram having a composite peak portion according to the second embodiment.

As an example different from the examples in FIG. 11 and FIG. 13, a case in which the first intermediate time is later than the second intermediate time will be described with reference to FIG. 12. A histogram hr4 illustrated in FIG. 12 is acquired by combining a histogram hr41 and a histogram hr42. The histogram hr41 is due to reflected light from the object OBJ1 illustrated in FIG. 10. The histogram hr42 is due to reflected light from the object OBJ2 illustrated in FIG. 10. However, the example illustrated in FIG. 12 differs from the example illustrated in FIG. 10 in that, at the pixel position 81, an exposed area of the region Ar1 viewed from the distance measurement device 10a is smaller than an exposed area of the region Art. In such a case, peak received light intensity of the histogram hr41 due to reflected light from the object OBJ1 is lower than peak received light intensity of the histogram hr42 due to reflected light from the object OBJ2. Hence, a composite peak portion mp4 has a distorted peak shape having a relatively low peak at temporally early position and a relatively high peak at temporally later position.

In the example illustrated in FIG. 12, in the composite peak portion mp4, two times (rise time Tu5 and fall time Td5) matching with first threshold received light intensity I21 is specified, and a second intermediate time Tc41 between the two times is specified. Furthermore, in the composite peak portion mp4, two times (rise time Tu6 and fall time Td6) matching with second threshold received light intensity I22 is specified, and a second intermediate time Tc42 between the two times is specified. In this example, the first intermediate time Tc41 is later than the second intermediate time Tc42.

As illustrated in FIG. 9, if it is determined that the first intermediate time is not the second intermediate time or earlier (step S108: NO), the above step S120 is performed in which the fall time specified in step S105 is determined as a base time of flight. In the example illustrated in FIG. 12, the fall time Td5 is determined as a base time of flight.

As illustrated in FIG. 9, after the completion of step S120 or step S123, the above steps S125 and S135 are performed.

As illustrated in FIG. 11, if the first intermediate time is the second intermediate time or earlier, as illustrated in FIG. 10, an exposed area of the object OBJ1 located on the near side is large when viewed from the distance measurement device 10a. In this case, since an object distance is calculated with reference to a time of flight of reflected light due to pulsed light on the surface of the object OBJ1, an object distance is calculated based on an object having great influence on the vehicle in which the distance measurement device 10a is installed. As illustrated in FIG. 12, if the first intermediate time is the second intermediate time or later, unlike the example in FIG. 10, an exposed area of the object OBJ2 located on the farther side is large when viewed from the distance measurement device 10a. In this case, since an object distance is calculated by setting the time of flight of reflected light due to pulsed light on the surface of the object OBJ2 as a base time of flight, also in this case, an object distance is calculated based on an object having great influence on the vehicle in which the distance measurement device 10a is installed.

The distance measurement device 10a of the second embodiment described above has effects similar to those of the distance measurement device 10 of the first embodiment. In addition, if the first intermediate time is earlier than the second intermediate time, a base time of flight is determined based on rise time. Hence, in a case in which a plurality of objects are present at different distances in the substantially same direction with reference to the distance measurement device 10a, and an irradiation area of pulsed light in the direction is larger on the object on the front side, the distance to the object on the front side can be determined as an object distance. If the first intermediate time is later than the second intermediate time, a base time of flight is determined based on fall time. Hence, in a case in which a plurality of objects are present at different distances in the substantially same direction with reference to the distance measurement device 10a, and an irradiation area of pulsed light in the direction is larger on the object on the rear side, the distance to the object on the rear side can be determined as an object distance. Thus, according to the distance measurement device 10a of the second embodiment, in a case in which a plurality of objects are present at different distances in the substantially same direction with reference to the distance measurement device 10a, the distance to the object on the front or rear side, that is, the distance to the position at which the object is actually present can be determined as an object distance. In addition, since the distance to the object having a larger irradiation area of pulsed light is determined as an object distance, the distance to the object having a larger irradiation area viewed from the distance measurement device 10a can be obtained as an object distance. Hence, for example, in a configuration providing a safety function for a vehicle by using an object distance, the function can be provided so as to ensure safety more reliably. If the first intermediate time is equal to the second intermediate time, a base time of flight is determined based on rise time. Hence, in a case in which a plurality of objects are present at different distances in the substantially same direction with reference to the distance measurement device 10a, and irradiation areas of pulsed light are equal to each other, the distance to any of the front and rear objects can be determined as an object distance. Hence, the distance to a position at which no object is present can be prevented from being determined as an object distance.

As can be understood from the second embodiment and the first embodiment described above, when a composite peak portion is present, the base time of flight determination unit 260 can determine a base time of flight based on any of the rise time and the fall time specified for the composite peak portion based on the first threshold received light intensity.

C. Third Embodiment

Since the configuration of a distance measurement device 10a of the third embodiment is the same as that of the distance measurement device 10a of the second embodiment illustrated in FIG. 8, the same components are denoted by the same reference numerals to omit the detailed descriptions. In the distance measurement device 10a of the second embodiment, threshold received light intensity used for specifying the rise time Tu3, the fall time Td3, and the intermediate time (first intermediate time) Tc31 is the common first threshold received light intensity I11. In the third embodiment, the threshold received light intensity used for specifying the rise time Tu3 and the fall time Td3 and the threshold received light intensity used for specifying the intermediate time (first intermediate time) are different from each other. Hereinafter, detailed descriptions will be given with reference to FIG. 14.

Figure 14:
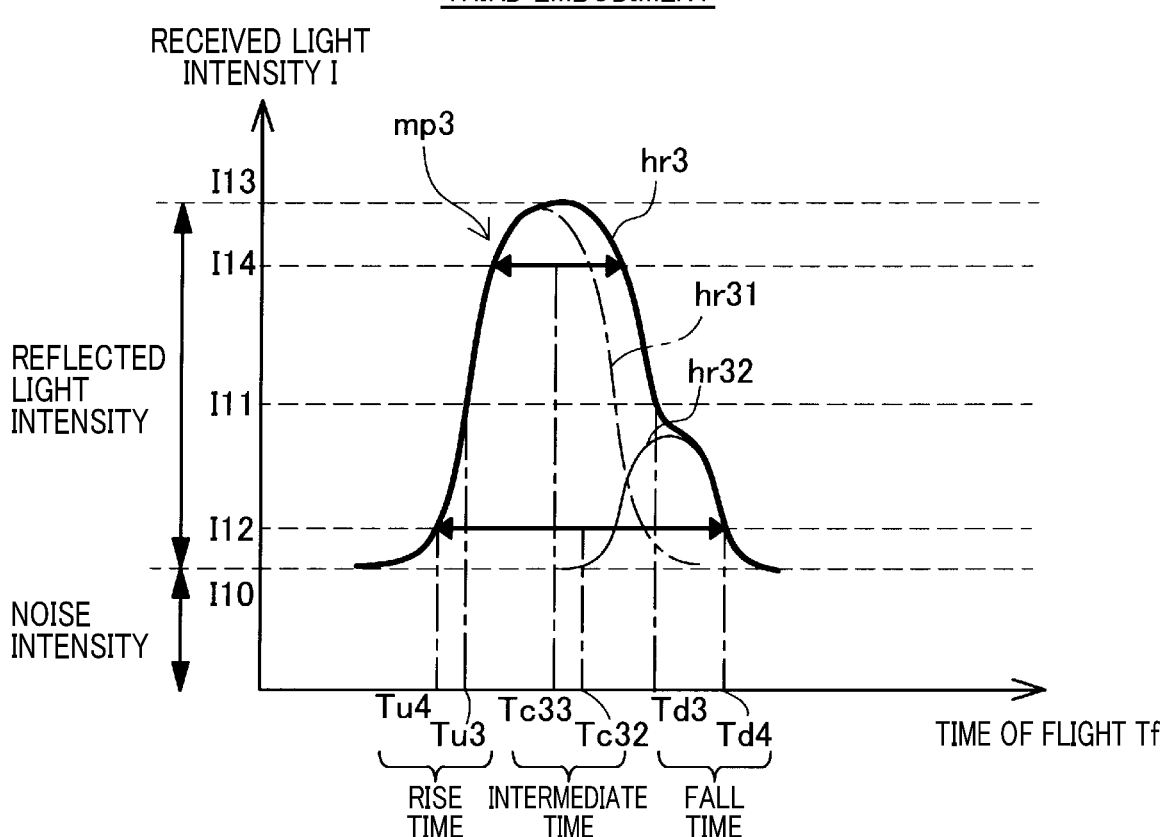
FIG. 14 is an explanatory diagram illustrating an example of a histogram having a composite peak portion according to a third embodiment.

As illustrated in FIG. 14, in the third embodiment, as in the second embodiment, the rise time Tu3 and the fall time Td3 are specified by using the first threshold received light intensity I11. In contrast, in the third embodiment, threshold received light intensity I14 for specifying an intermediate time Tc33 is set in addition to the above first threshold received light intensity I11. Then, two times matching with the threshold received light intensity I14 in the composite peak portion mp3 are specified, and the intermediate time between the two times is specified as an intermediate time Tc33. The intermediate time Tc33 is used as the first intermediate time instead of the intermediate time Tc31 of the second embodiment. Hence, for example, in step S108 of the distance measurement process illustrated in FIG. 9, it is determined whether the intermediate time Tc33, which is the first intermediate time, is the intermediate time Tc32, which is the second intermediate time, or earlier. In the third embodiment, the threshold received light intensity I14 is previously set as a value higher than the first threshold received light intensity I11 and equal or lower than intensity I13, which is peak received light intensity of the composite peak portion mp3. The threshold received light intensity I14 may be set as a value lower than the first threshold received light intensity I11 and higher than the second threshold received light intensity I12.

The distance measurement device 10a of the third embodiment described above has effects similar to those of the distance measurement device 10a of the second embodiment. The threshold received light intensity I14 in the third embodiment corresponds to third threshold received light intensity of the present disclosure.

D. Fourth Embodiment

D1. Device Configuration:

Since the configuration of a distance measurement device 10 of the fourth embodiment is the same as that of the distance measurement device 10 of the first embodiment, the same components are denoted by the same reference numerals to omit the detailed descriptions. As described in the first embodiment, the direction of the pixel position, at which clutter generated due to reflected light due to pulsed light being reflected by the window 92 or the inner wall of the housing is specified, and the extent of the time of flight at which the clutter is specified can be previously specified by experiment or simulation. When foreign matter such as sand and dirt adheres to the outer surface of the window 92, reflected light due to pulsed light at the position becomes substantially great, whereby clutter may be newly generated. In such a case, since a pixel position at which clutter is generated depends on the position at which the foreign matter adheres, the pixel position cannot be previously specified. In the distance measurement device 10 of the fourth embodiment, the clutter position setting process described later is performed to specify and set the position (the direction of the pixel position) of clutter generated due to the adhesion of foreign matter or the like as described above.

Figure 15:
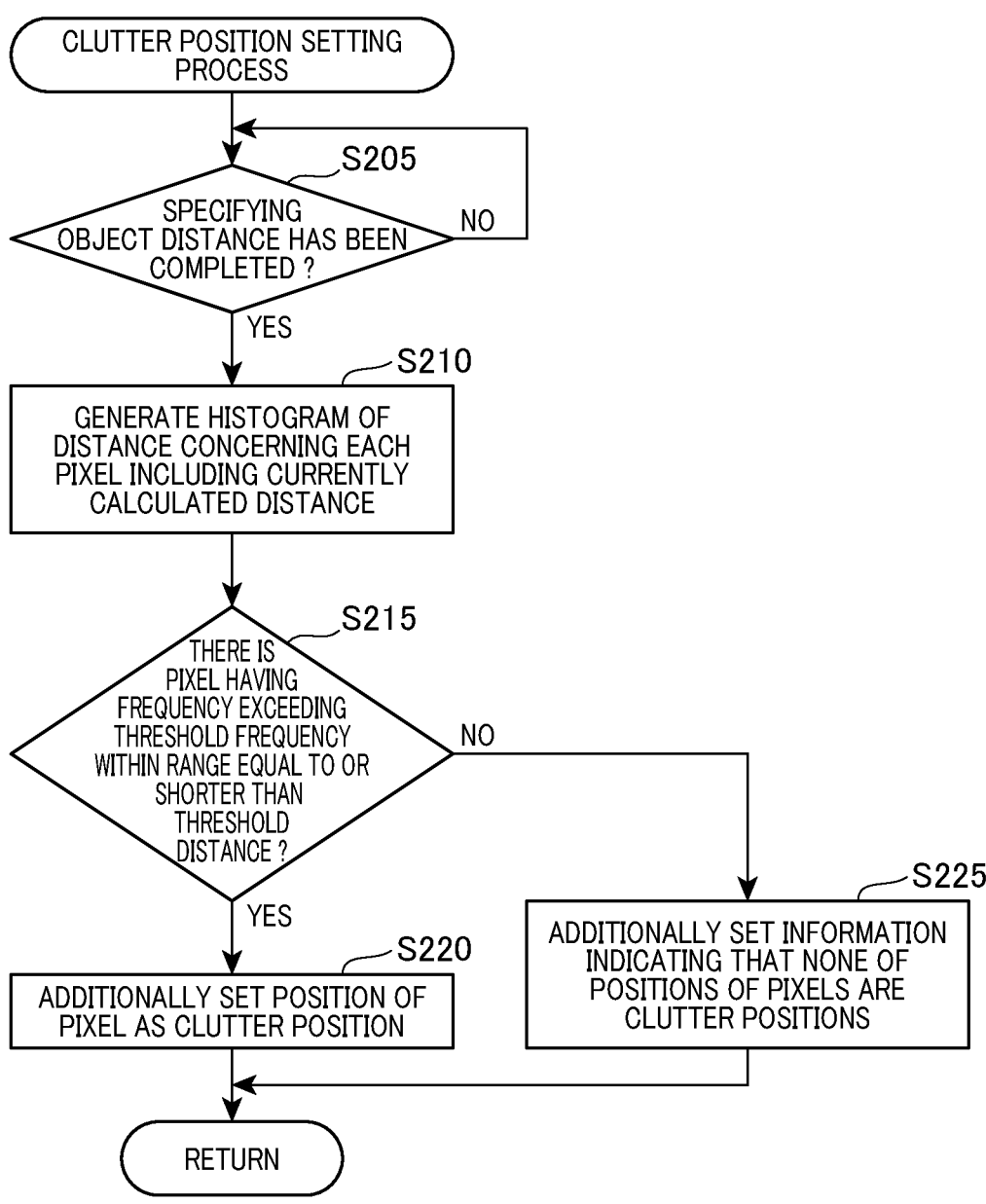
FIG. 15 is a flowchart illustrating a procedure of a clutter position setting process according to a fourth embodiment.

D2. Clutter Position Setting Process:

The clutter position setting process illustrated in FIG. 15 is performed when a power source of the distance measurement device 10 is turned on. The histogram generation unit 230 determines whether specifying an object distance by the distance measurement process illustrated in FIG. 6 has been completed (step S205). At the time when specifying an object distance is completed, concerning each pixel, a distance from the distance measurement device 10 to an object is specified.

The histogram generation unit 230 generates a histogram of distance concerning each pixel including a distance specified by the current distance measurement process (step S210). In the present embodiment, concerning each pixel, the memory 290 stores object distances specified for a predetermined number of times. The number of times may be, though depending on the size of the memory 290, for example, at most 100. Then, when a new object distance is specified in a state in which 100 object distances are stored, the new specified object distance may be stored by updating the latest stored object distance. The histogram of distance concerning each pixel generated in step S210 corresponding to a statistic of an object distance calculated for each pixel.

Figure 16:
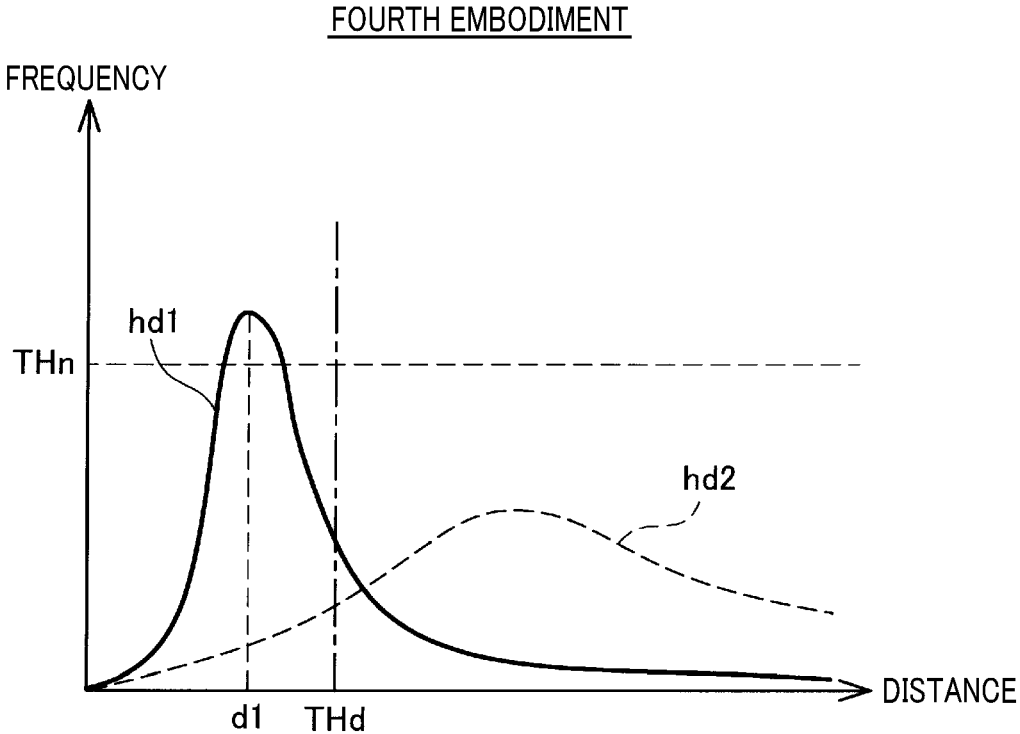
FIG. 16 is an explanatory diagram illustrating an example of a histogram of distance according to the fourth embodiment.

In FIG. 16, as an example of the histogram generated in step S210, two histograms hd1, hd2 are illustrated. The histogram hd1 represented by a thick solid is concerning a pixel whose position is different from the position at which it is previously predicted that clutter is generated, and is obtained when foreign matter such as dirt adheres to the window 92. The histogram hd2 represented by a thin broken line is concerning a pixel whose position is different from the position at which it is previously predicted that clutter is generated, and is obtained when foreign matter such as dirt does not adhere to the window 92.

When foreign matter adheres to the window 92, the peak of the frequency is generated at a distance corresponding to the position of the window 92. In contrast, concerning other distances, due to the adhesion of foreign matter, even if reflected light approaches from the corresponding direction, the reflected light is blocked by the foreign matter, whereby a distance based on the reflected light is not specified, and the frequency concerning the distance remains low. Hence, as illustrated in the histogram hd1, a peak is generated at a relatively short distance dl.

In contrast, when no foreign matter adheres to the window 92, if the vehicle is moving, an object can be present at various distances in the direction corresponding to the pixel. Hence, as illustrated in the histogram hd2, the frequency is more than 0 in a wide range of distances. For example, a histogram having a shape of a gentle hill is obtained.

As illustrated in FIG. 15, the histogram generation unit 230 determines whether there is a pixel having a frequency exceeding a threshold frequency within a range equal to or shorter than a threshold distance (step S215). When the histogram hd1 in FIG. 16 is obtained, since the frequency exceeding a threshold frequency THn is recorded within a range equal to or shorter than a threshold distance THd, the pixel corresponding to the histogram hd1 corresponds to the pixel having a frequency exceeding the threshold frequency within the range equal to or shorter than the threshold distance. In contrast, when the histogram hd2 in FIG. 16 is obtained, since the frequency exceeding the threshold frequncy THn is not recorded within the range equal to or shorter than the threshold distance THd, the pixel corresponding to the histogram hd2 does not correspond to the pixel having a frequency exceeding the threshold frequency within the range equal to or shorter than the threshold distance.

As illustrated in FIG. 15, if it is determined that there is a pixel having a frequency exceeding the threshold frequency within the range equal to or shorter than the threshold distance (step S215: YES), the histogram generation unit 230 additionally sets, as a clutter position, the position of the pixel having a frequency exceeding the threshold frequency within the range equal to or shorter than the threshold distance (step S220). As described above, since a clutter position has been stored in the memory 290, the histogram generation unit 230 reads information on the clutter position to add the pixel position specified in step S215 to the information and stores the information in the memory 290. After the completion of step S220, the process returns to step S205.

In the above step S215, if it is determined that there is no pixel having a frequency exceeding the threshold frequency within the range equal to or shorter than the threshold distance (step S215: NO), the histogram generation unit 230 additionally sets information indicating that none of the positions of the pixels are clutter positions (step S225). After the completion of step S225, the process returns to step S205. In the present embodiment, windshield wipers for wiping the window 92 may be provided. If it is determined that there is a pixel having a frequency exceeding the threshold frequency within the range equal to or shorter than the threshold distance in step S215, the windshield wipers may wipe the window 92. If there is a pixel having a frequency exceeding the threshold frequency within the range equal to or shorter than the threshold distance due to foreign matter such as dirt adhering to the window 92, after the foreign matter is removed by wiping by the windshield wipers, it is determined that there is no pixel having a frequency exceeding the threshold frequency within the range equal to or shorter than the threshold distance in step S215. Then, performing step S225 updates the information indicating that the clutter position is derived from foreign matter to the information indicating that there is no clutter position.

Instead of the histogram generation unit 230, the distance calculation unit 270 or another functional unit may perform the above steps S205 to S220. Alternatively, another new functional unit other than the functional units illustrated in FIG. 4 may perform the above steps S205 to S220. Thus, the functional unit performing the above steps S205 to S220 corresponds to a clutter position setting unit.

The distance measurement device 10 of the fourth embodiment described above has effects similar to those of the distance measurement device 10 of the first embodiment. In addition, the distance measurement device 10 of the fourth embodiment generates a histogram of distance of each pixel. If it is determined that there is a pixel having a frequency exceeding the threshold frequency THn within the range equal to or shorter than the threshold distance THd, the position of the pixel is set as a clutter position. Hence, the position of clutter generated due to adhesion of foreign matter such as dirt to the window 92 can be specified. Thus, in step S110 of the distance measurement process illustrated in FIG. 6, it can be accurately determined whether the position of reflected light agrees with the position of clutter.

E. Fifth Embodiment

Since the configuration of a distance measurement device 10 of the fifth embodiment is the same as that of the distance measurement device 10 of the fourth embodiment, the same components are denoted by the same reference numerals to omit the detailed descriptions. The distance measurement device 10 of the fifth embodiment differs from the distance measurement device 10 of the fourth embodiment in procedures of the clutter position setting process.

Figure 17:
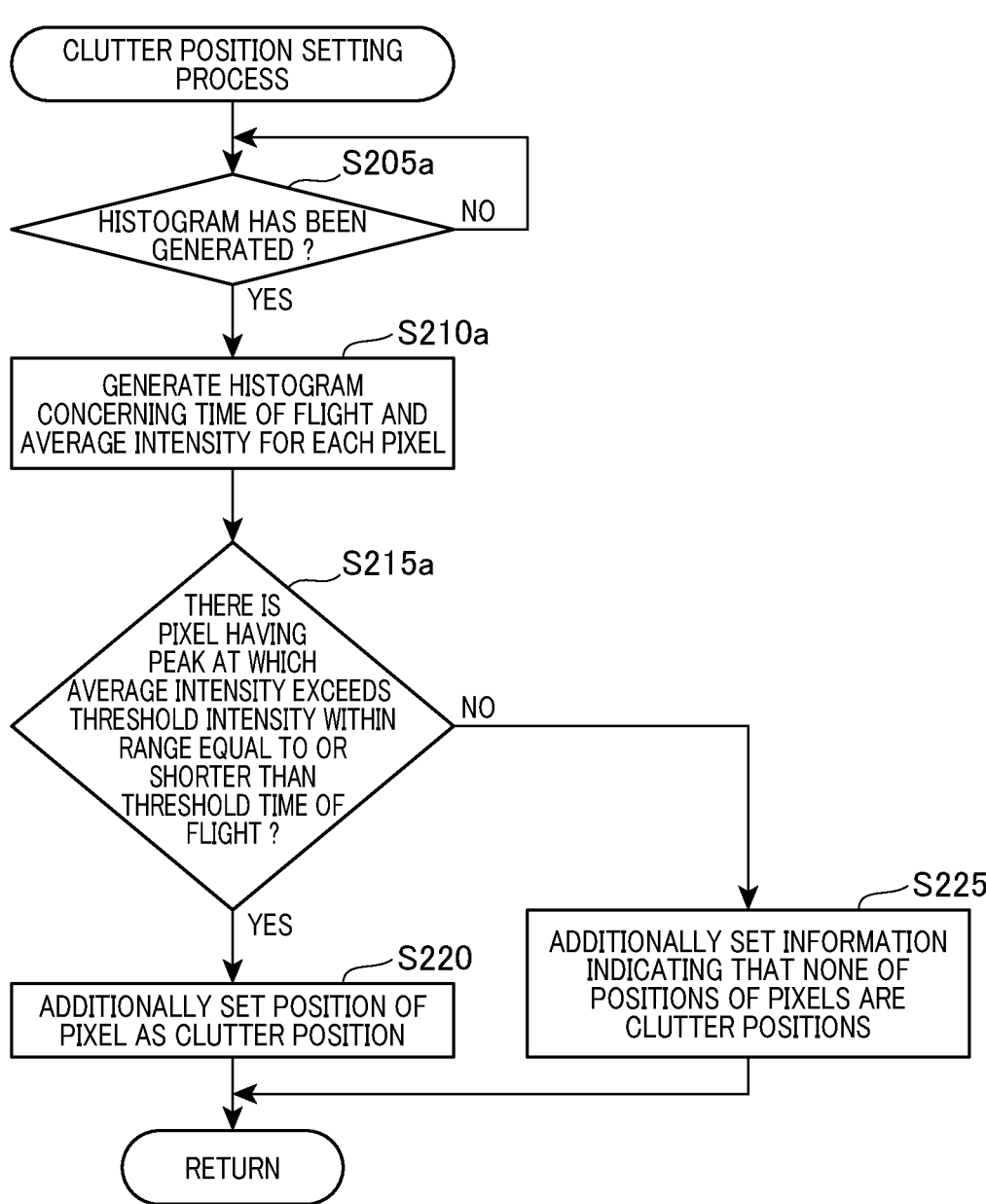
FIG. 17 is a flowchart illustrating a procedure of a clutter position setting process according to a fifth embodiment.

The clutter position setting process of the fifth embodiment illustrated in FIG. 17 differs from the clutter position setting process of the fourth embodiment illustrated in FIG. 15 in performing step S205*a* instead of step S205, performing step S210*a* instead of step S210, and performing step S215*a* instead of step S215. Since other procedures of the clutter position setting process of the fifth embodiment are the same as those of the clutter position setting process of the fourth embodiment, the same procedures are denoted by the same reference numerals to omit the detailed descriptions.

As illustrated in FIG. 17, the histogram generation unit 230 determines whether a histogram has been generated (step S205*a*). If it is determined no histogram has been generated (step S205*a*: NO), the process returns to step S205*a*. That is, the histogram generation unit 230 waits until a histogram is generated.

If it is determined that a histogram has been generated (step S205*a*: YES), the histogram generation unit 230 generates, in addition to the currently calculated histogram, a histogram concerning time of flight and average intensity for each pixel (step S210*a*). In the present embodiment, the histogram concerning each pixel generated by the histogram generation unit 230 is stored in the memory 290. In step S210*g*, the histogram generation unit 230 determines, concerning a plurality of histograms stored in the memory 290, an average value of intensity at each time of flight Tg, thereby generating a histogram of average intensity. The histogram of average intensity generated for each pixel corresponds to a statistic of received light intensity of each pixel of the present disclosure.

Figure 18:
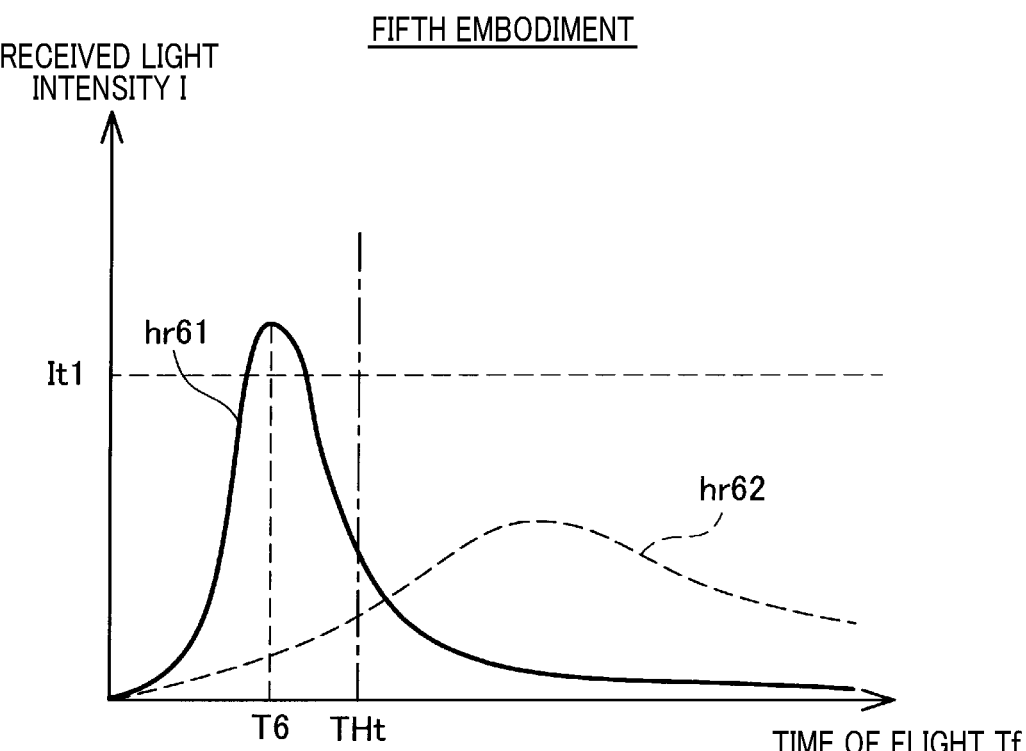
FIG. 18 is an explanatory diagram illustrating an example of a histogram according to the fifth embodiment.

In FIG. 18, as an example of a histogram generated in step S210*a*, two histograms hr61, hr62 are illustrated. The histogram hr61 represented by a thick solid line is concerning a pixel whose position is different from the position at which it is previously predicted that clutter is generated and is obtained when foreign matter such as dirt adheres to the window 92. The histogram hr62 represented by a thin broken line is concerning a pixel whose position is different from the position at which it is previously predicted that clutter is generated and is obtained when foreign matter such as dirt does adhere to the window 92.

When foreign matter adheres to the window 92, the peak of the received light intensity I is generated at a time of flight Tf corresponding to the position of the window 92 (more accurately, a round-trip time of flight to the position). In contrast, concerning other times of flight Tf, due to the adhesion of foreign matter, even if reflected light approaches from the corresponding direction, the reflected light is blocked by the foreign matter, whereby a time of flight Tf based on the reflected light is not specified, and the received light intensity I concerning the time of flight Tf remains low. Hence, as illustrated in the histogram hr61, a peak is generated at a relatively short time T6.

In contrast, when no foreign matter adheres to the window 92, if the vehicle is moving, an object can be present at various distances in the direction corresponding to the pixel. Hence, as illustrated in the histogram hr62, the received light intensity I is more than 0 in a wide range of time of flight Tf. For example, a histogram having a shape of a gentle hill is obtained.

As illustrated in FIG. 17, the histogram generation unit 230 determines whether there is a pixel having a peak at which average intensity exceeds threshold intensity within a range equal to or shorter than a threshold time of flight (step S215*a*). When the histogram hr61 in FIG. 18 is obtained, since the time of flight T6 at which threshold intensity It1 is exceed is recorded within a range equal to or shorter than a threshold time of flight THt, the pixel corresponding to the histogram hr61 corresponds to the pixel having a frequency exceeding the threshold intensity It1 within a range equal to or shorter than the threshold time of flight THt. In contrast, when the histogram hr62 in FIG. 18 is obtained, since the frequency exceeding the threshold intensity It1 is not recorded within the range equal to or shorter than the threshold time of flight THt, the pixel corresponding to the histogram hr62 does not correspond to the pixel having intensity exceeding the threshold intensity It1 within the range equal to or shorter than the threshold time of flight THt.

If it is determined that there is a pixel having a peak, whose average intensity exceeds the threshold intensity It1, within the range equal to or shorter than the threshold time of flight THt (step S215*a*: YES), the histogram generation unit 230 additionally sets, as a clutter position, the position of the pixel having a peak, whose average intensity exceeds the threshold intensity It1, within the range equal to or shorter than the threshold time of flight THt (step S220).

In contrast, in the above step S215*a*, if it is determined that there is no pixel having a peak, whose average intensity exceeds the threshold intensity It1, within the range equal to or shorter than the threshold time of flight THt (step S215*a*: NO), the process returns to step S205*a*. Hence, in this case, the clutter position stored in the memory 290 is not updated.

The distance measurement device 10 of the fifth embodiment described above has effects similar to those of the distance measurement device 10 of the fourth embodiment. In addition, the distance measurement device 10 of the fifth embodiment generates a histogram concerning time of flight and average intensity for each pixel. If it is determined that there is a pixel having intensity exceeding the threshold intensity It1 within the range equal to or shorter than the threshold time of flight THt, the position of the pixel is set as a clutter position. Hence, the position of clutter generated due to adhesion of foreign matter such as dirt to the window 92 can be specified. Thus, in step S110 of the distance measurement process illustrated in FIG. 6, it can be accurately determined whether the position of reflected light agrees with the position of clutter.

F. Sixth Embodiment

Since the configuration of a distance measurement device 10 of the sixth embodiment is the same as that of the distance measurement device 10 of the first embodiment except for the detailed procedure of the distance measurement process, the same components are denoted by the same reference numerals to omit the detailed descriptions. The distance measurement process of the sixth embodiment illustrated in FIG. 19 differs from the distance measurement process of the first embodiment illustrated in FIG. 6 in that step S132 is added and performed. Since other procedures of the distance measurement process of the sixth embodiment are the same as those of the distance measurement process of the first embodiment, the same procedures are denoted by the same reference numerals to omit the detailed descriptions.

Figure 19:
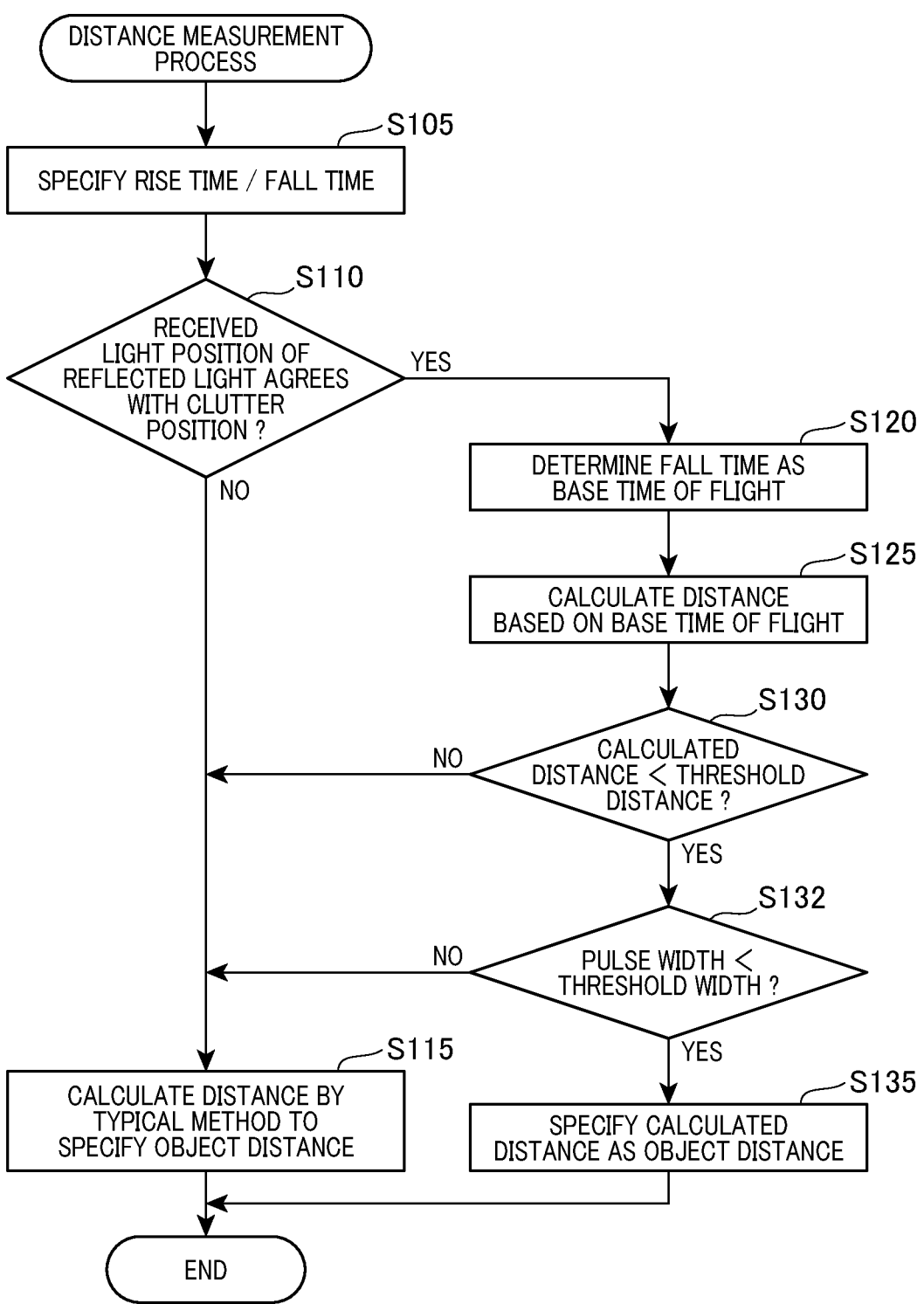
FIG. 19 is a flowchart illustrating a procedure of a distance measurement process according to a sixth embodiment.

As illustrated in FIG. 19, in step S130, if it is determined that the calculated distance is the threshold distance or shorter (step S130: YES), the distance calculation unit 270 determines whether a pulse width of a composite peak portion is a predetermined threshold width or smaller (step S132). In the present embodiment, the pulse width in step S132 means the first threshold received light intensity, that is, a width of the time of flight used for determining rise time and fall time of a peak portion. In the present embodiment, the threshold width in step S132 means a width of the time of flight set for distinguishing whether the composite peak portion is formed from clutter and reflected light from an object or formed by multipath reflection described later. Typically, the width of the peak portion formed by multipath reflection is larger than the width of the peak portion formed from clutter and reflected light from an object. The threshold width by which the distinction can be performed is determined by experiment or simulation and is set. The multipath reflection means that pulsed light and reflected light thereof goes back and forth several times between an object having a high reflectance (hereinafter, referred to as high reflectance object) such as a reflector mounted to the rear of the vehicle and the distance measurement device 10, and reflect each other. When pulsed light is emitted to a high reflectance object, intensity of the reflected light thereof is high. Hence, the reflected light may be reflected by the window 92 or the interior of the housing 90 and irradiate the high reflectance object again, whereby reflected light traveling to the distance measurement device 10 again may be generated. When multipath reflection occurs by repetition of such reflection, a histogram is generated which is obtained by integrating a plurality of histograms in which as reflected light goes back and forth between the high reflectance object and the distance measurement device 10, the time of flight Tf becomes longer and the received light intensity the becomes lower.

Figure 20:
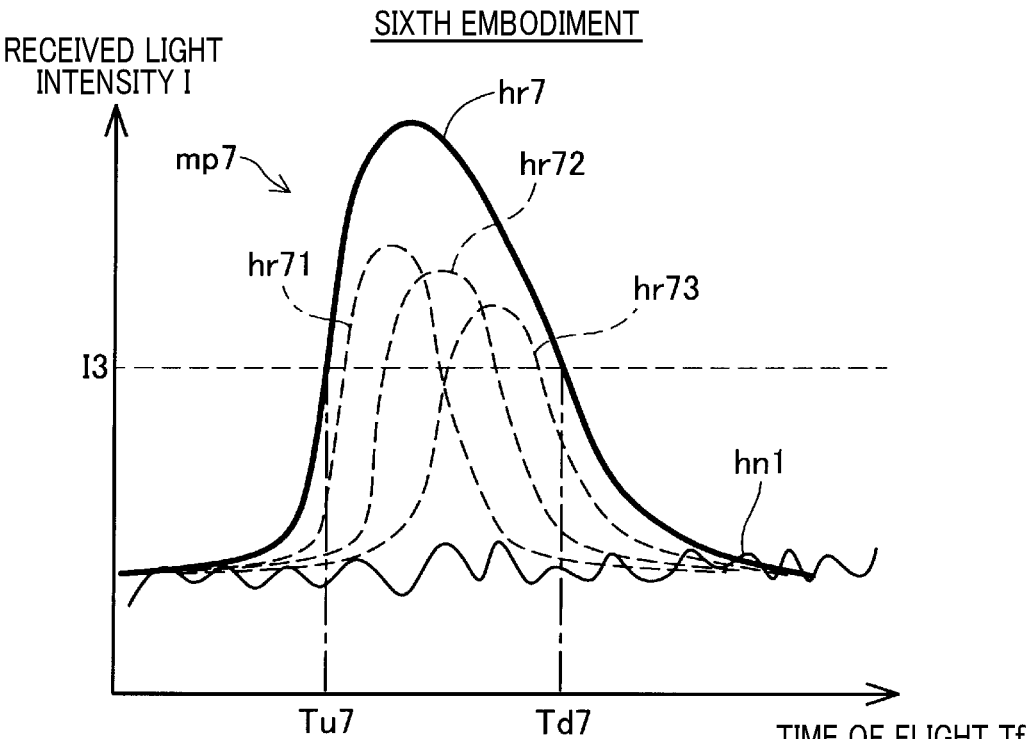
FIG. 20 is an explanatory diagram illustrating an example of a histogram according to the sixth embodiment.

For example, in an example illustrated in FIG. 20, a histogram hr71 obtained by the first reflected light, a histogram hr72 obtained by the second reflected light, and a histogram hr73 obtained by the third reflected light are combined to generate a histogram hr7 having a wide width which indicates a composite peak portion mp7. In the example illustrated in FIG. 20, at times of flight Tu7, Td7, received light intensity matching with the first threshold received light intensity I3 is obtained. The time of flight Tu7, which is earlier than the time of flight Td7, is defined as rise time. The time of flight Td7, which is later than the time of flight Tu7, is defined as fall time.

In step S132 illustrated in FIG. 19, if it is determined that the pulse width of the composite peak portion is a predetermined threshold width or smaller (step S132: YES), the above step S135 is performed. If the pulse width of the composite peak portion is the predetermined threshold width or smaller, the composite peak portion is highly likely to be formed from clutter and reflected light from an object.

Hence, in this case, as in the first embodiment, the distance calculated in step S125 is specified as an object distance.

In contrast, if it is determined that the pulse width of the composite peak portion is not the predetermined threshold width or smaller (step S132: NO), the above step S115 is performed to calculate an object distance by a typical method. That is, the intermediate time between the rise time Tu7 and the fall time Td7 is specified as peak time to specify an object distance by using the peak time. If it is determined that the pulse width of the composite peak portion is not the predetermined threshold width or smaller, that is, if the probability is high that the pulse width of the composite peak portion is large and multipath reflection is generated, it is desirable that a distance is determined based on the first reflected light. However, in the above step S135, since the distance calculated by setting the fall position as a base time of flight is specified as an object distance, accuracy in the specification may be low. The reason is that the fall time, which has become late due to the elongated time of flight due to the repetition of multipath reflection, is set as the base time of flight. Hence, in the present embodiment, in such a case, step S135 is not performed, and a distance is calculated by a typical method to use the distance as an object distance.

The distance measurement device 10 of the sixth embodiment described above has effects similar to those of the distance measurement device 10 of the first embodiment. In addition, it is determined whether the pulse width is the threshold width or smaller. If the pulse width is not the threshold width or smaller, the distance calculated by a typical method is specified as an object distance. Hence, compared with a configuration in which, concerning a composite peak portion obtained by multipath reflection, an object distance is calculated and specified by setting fall time as a base time of flight, the object distance can be accurately specified.

G. Seventh Embodiment

Since the configuration of a distance measurement device 10a of the seventh embodiment is the same as that of the distance measurement device 10a of the second embodiment except for the detailed procedure of the distance measurement process, the same components are denoted by the same reference numerals to omit the detailed descriptions. The distance measurement process of the seventh embodiment illustrated in FIG. 21 differs from the distance measurement process of the second embodiment illustrated in FIG. 9 in that, instead of steps S108, S120, and S123, step S117 is performed. Since other procedures of the distance measurement process of the seventh embodiment are the same as those of the distance measurement process of the second embodiment, the same procedures are denoted by the same reference numerals to omit the detailed descriptions.

Figure 21:
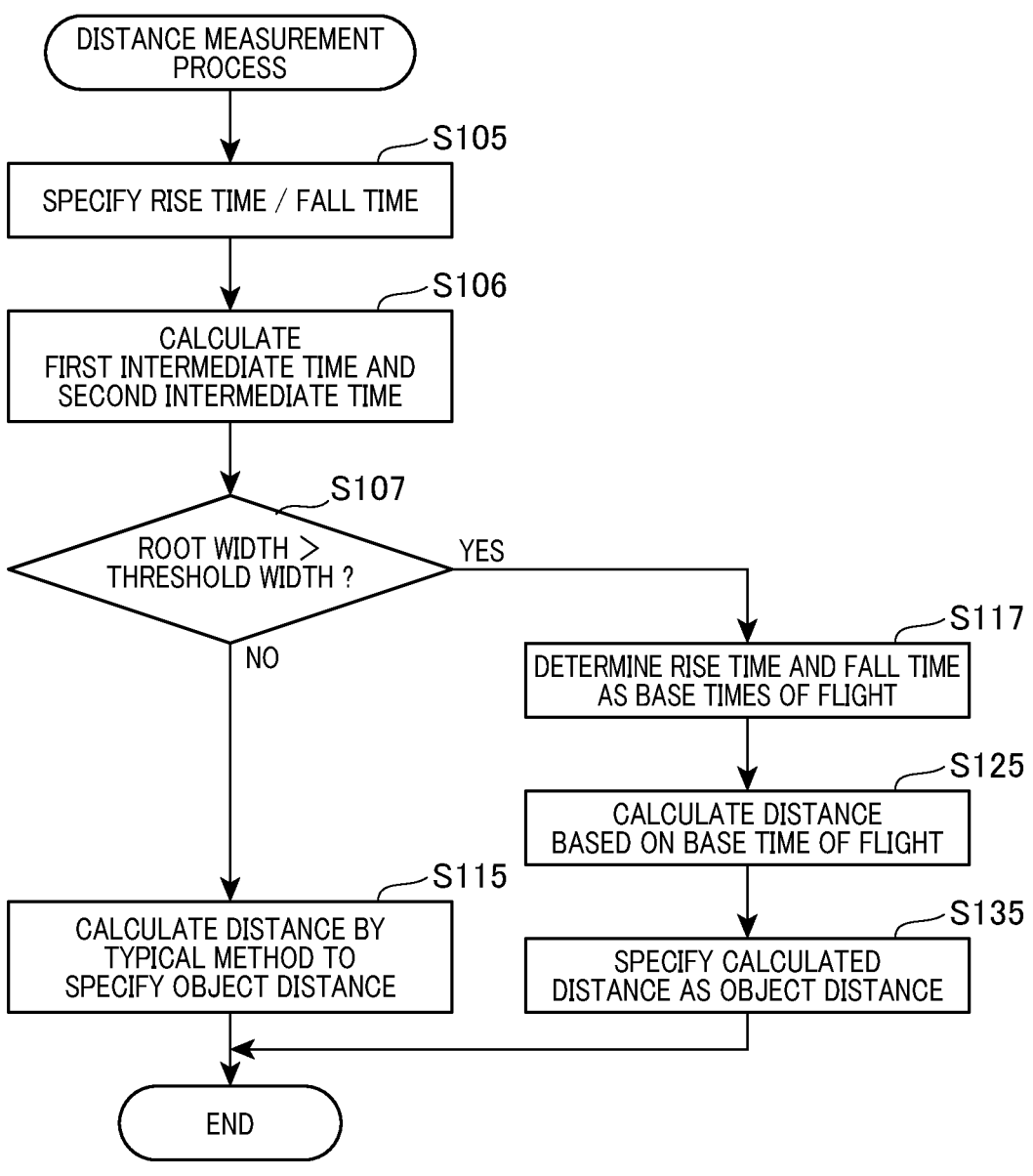
FIG. 21 is a flowchart illustrating a procedure of a distance measurement process according to a seventh embodiment.

As illustrated in FIG. 21, in step S107, if it is determined that the root width is larger the threshold width (step S107: YES), the base time of flight determination unit 260 determines rise time and fall time as base times of flight respectively (step S117). After the completion of step S117, the above steps S125 and S135 are performed. Since rise time and fall time are determined as base times of flight respectively in step S117, in step S125, distances are calculated based on the respective base times of flight, and in step S135, both the calculated two distances are specified as object distances. As illustrated in FIG. 10, when two objects OBJ1, OBJ2 are present, it may be required to determine distances concerning the two objects OBJ1, OBJ2. This is due to, for example, a request to accurately specify respective distances to two objects present back and forth. According to the present embodiment, since a distance is determined with reference to rise time, that is, the time derived from the object located on the near side, an object distance concerning the object located on the near side can be accurately determined. Since a distance is determined with reference to fall time, that is, the time derived from the object located on the far side, an object distance concerning the object located on the far side can be accurately determined.

The distance measurement device 10a of the seventh embodiment described above has effects similar to those of the distance measurement device 10a of the second embodiment. In addition, if it is determined that the root width is larger than the threshold width, that is, if it is highly likely that a composite peak portion has been obtained by combining the peak portions included in the histograms of reflected light from a plurality of objects, since rise time and fall time are determined as base times of flight respectively, distances to two objects present back and forth are accurately specified.

H. Other Embodiments (H1) If it is estimated that there is no composite peak portion, that is, if it is determined that the received light position of reflected light does not agree with the position of clutter in the first embodiment (step S110: NO), or if it is determined that the root width is not larger than the threshold width in the second and third embodiments (step S107: NO), step S115 is performed, and an intermediate time between rise time and fall time of a peak portion is set as a base time of flight to calculate an object distance. However, the present disclosure is not limited to this. In such a case, any one of the rise time and the fall time of the peak portion may be set as a base time of flight to calculate an object distance.

(H2) In the second and third embodiments, in a case in which presence of a composite peak portion is estimated, rise time or fall time of the composite peak portion is determined as a base time of flight according to a result of comparison between the first intermediate time and the second intermediate time. However, the present disclosure is not limited to this. For example, in a case in which presence of a composite peak portion is estimated, rise time may be determined as a base time of flight without the comparison between the first intermediate time and the second intermediate time. According to the configuration, a distance to an object located on the front side when viewed from the distance measurement device 10a can be easily determines as an object distance, and a distance to the nearer object that has great influence on the vehicle can be determined.

(H3) In the second and third embodiments, if the first intermediate time is equal to the second intermediate time, the base time of flight determination unit 260 determines rise time as a base time of flight. However, instead of rise time, fall time may be determined as a base time of flight.

(H4) The configurations of the distance measurement devices 10, 10a in the embodiments can be variously modified. For example, in the distance measurement process of the first embodiment, step S130 may be omitted. In step S135, a distance may be newly calculated based on the base time of flight to specify an object distance. The distance measurement devices 10, 10a may be installed in not only a vehicle but also any movable body such as a plane and a boat. Alternatively, for applications such as security, the distance measurement devices 10, 10a may be used in a fixed state. The housings of the distance measurement devices 10, 10*a* may not have a window member but may be simply provided with an opening.

(H5) The calculation unit 20 and the method executed thereby in the present disclosure may be implemented by a dedicated computer including a processor and a memory programmed to execute one or more functions embodied by a computer program. The calculation unit 20 and the method executed thereby in the present disclosure may be implemented by a dedicated computer including a processor formed of one or more dedicated hardware logical circuits. The calculation unit 20 and the method executed thereby in the present disclosure may be implemented by one or more dedicated computers including a combination of a processor and a memory programmed to execute one or more functions and a processor including one or more hardware logical circuits. The computer program may be stored, as instructions to be executed by a computer, in a computer-readable non-transitory tangible storage medium.

(H6) In step S210 of the clutter position setting process of the fourth embodiment, when a histogram is generated, an object distance serving as the base is specified. However, the integrated degree may be weighted depending on whether the vehicle is traveling. Specifically, when the vehicle is traveling, a higher degree may be integrated compared with a case in which the vehicle is not traveling (that is, a case in which the vehicle is stopped). When the vehicle is stopped, the temporal change of the distance to an object present around the vehicle is small. When an object is present at a short distance, a histogram in which the frequency is high in the range of short distance is highly likely to be generated. Hence, a histogram may be obtained in which the frequency is high in the range of short distance though no foreign matter adheres to the window 92, whereby an incorrect clutter position may be specified. In contrast, when the vehicle is traveling, the temporal change of the distance to an object present around the vehicle is large. Hence, even when an object is present at a short distance, since the object is present for a short time, a histogram in which the frequency is high in the range of short distance is not likely to be generated. However, when the frequency is high in the range of short distance while the vehicle is traveling, it is highly likely that foreign matter has adhered to the window 92, whereby clutter has been generated. Hence, when the vehicle is traveling, a higher degree is integrated compared with a case in which the vehicle is not traveling (that is, the vehicle is stopped) so that the frequency becomes high when the vehicle is traveling. Instead of performing weighting depending on whether the vehicle is traveling as described above, the clutter position setting process may be performed only when an object distance is specified while the vehicle is traveling, and the clutter position setting process may not be performed while the vehicle is stopped.

(H7) The threshold width used in step S132 of the sixth embodiment is a fixed value previously specified by experiment or the like. However, the present disclosure is not limited to this. The threshold width may be changed depending on fall time of the composite peak portion. Specifically, as fall time of the composite peak portion is longer, the threshold width may be set to be larger. When the fall time of the composite peak portion is long, it can be assumed that the number of multipath reflections is large. Hence, in such a case, setting a larger threshold width can accurately distinguish between a case in which a plurality of objects, which are present at different distances in the substantially same direction, are present in a relatively long range in the depth direction and a case in which multipath reflection has been occurred.

(H8) In the sixth embodiment, in step S132, if it is determined that a pulse width of the composite peak portion is not the predetermined threshold width or smaller (step S132: NO), step S115 is performed to calculate a distance by a typical method, that is, by setting the intermediate time as a base time of flight. However, the present disclosure is not limited to this. In this case, unlike the typical method, a distance may be calculated with reference to rise time. As described above, when multipath reflection has occurred, the distance calculated based on the first reflected light is determined as a value closer to an object distance. The reason is that as the number of times of reflection increases, round-trip time of reflected light is added, whereby the resultant time is greatly displaced from the accurate time of flight (round-trip time to the reflecting object). Hence, providing the configuration described above can accurately specify an object distance in a state in which multipath reflection has occurred.

The present disclosure can be implemented by various embodiments. For example, the embodiments include a distance measurement system, a movable body in which the distance measurement device is installed, a distance measurement method, a computer program for implementing the devices and method, and a non-transitory storage medium storing the computer program.

The present disclosure is not limited to the above embodiments and can be implemented by various configurations within a range not deviating from the spirit thereof. For example, technical features in the embodiments corresponding to the technical features in the aspect described in SUMMARY can be appropriately replaced or combined with each other in order to solve all or part of the problems described above or to achieve all or part of the effects described above. Some of the technical features can be appropriately deleted if they are not described as essentials herein.

An aspect of the present disclosure provides a distance measurement device (10, 10*a*). The distance measurement device includes: a light emitting unit (40) that emits pulsed light; a light receiving unit (60) that receives light including reflected light due to the pulsed light; and a calculation unit (20) that uses a time of flight (time-of-flight) of the light received by the light receiving unit to calculate an object distance, which is a distance to an object that reflects the pulsed light and outputs the reflected light. The calculation unit includes: a histogram generation unit (230) that generates a histogram representing received light intensity at the light receiving unit in each of a plurality of the times of flight; a composite peak portion estimation unit (240) that estimates whether a composite peak portion is present in the histogram, the composite peak portion being a peak portion at which the received light intensity changes from an increasing state to a decreasing state with respect to the time of flight with reference to a peak time of flight and which is obtained from a combination of distributions of intensity of light from a plurality of objects, differences of distances to the objects from the distance measurement device being within a predetermined range; a time of flight (time-of-flight) specification unit (250) that specifies two times of flight matching with first threshold received light intensity higher than received light intensity of noise light including background light, the two times of flight being rise time that is the shorter time of flight and fall time that is the longer time of flight; a base time of flight (base time-of-flight)

determination unit (260) that, if it is estimated that the composite peak portion is present, determines a base time of flight that is a base for calculating the object distance based on the rise time or the fall time specified concerning the composite peak portion, and a distance calculation unit (270) that uses the base time of flight to calculate a distance to one of the plurality of objects as the object distance.

The distance measurement device according to the aspect determines a base time of flight that is a base for calculating an object distance based on rise time or fall time specified concerning a composite peak portion, and uses the determined base time of flight to calculate the object distance. Hence, even in a case in which time variations of received light intensity of reflected light from a plurality of objects are superimposed to form a shape such as a single peak, an object distance can be accurately measured.

What is claimed is:

1. A distance measurement device, comprising:

a light emitting unit that emits pulsed light;

a light receiving unit that receives light including reflected light due to the pulsed light; and a calculation unit that uses a time of flight of the light received by the light receiving unit to calculate an object distance as a distance to an object that reflects the pulsed light and outputs the reflected light, the calculation unit including:

a histogram generation unit that generates a histogram representing received light intensity at the light receiving unit for each of a plurality of times of flight, a composite peak portion estimation unit that estimates presence of a composite peak portion in the histogram, the composite peak portion being a peak portion at which the received light intensity changes from an increasing state to a decreasing state with respect to the time of flight with reference to a peak time of flight and which is obtained from a combination of distributions of intensity of light from a plurality of objects, and differences of distances to the plurality of objects from the distance measurement device being within a predetermined range, a time of flight specification unit that specifies two times of flight matching with a first threshold received light intensity and a received light intensity of noise light including background light, the first threshold received light intensity being higher than the received light intensity of noise light, and the two times of flight including a rise time as the time of flight that is shorter and a fall time as the time of flight that is longer, a base time of flight determination unit that determines a base time of flight that is a base for calculating the object distance based on the rise time or the fall time specified concerning the composite peak portion, the base time of flight determination unit determining the base time of flight in a different way when estimating that the composite peak portion is present compared to when estimating that the composite peak portion is not present, and a distance calculation unit that uses the base time of flight to calculate a distance to one of the plurality of objects as the object distance.

2. A distance measurement device, comprising:

a light emitting unit that emits pulsed light;

a light receiving unit that receives light including reflected light due to the pulsed light; and a calculation unit that uses a time of flight of the light received by the light receiving unit to calculate an object distance as a distance to an object that reflects the pulsed light and outputs the reflected light, the calculation unit including:

a histogram generation unit that generates a histogram representing received light intensity at the light receiving unit for each of a plurality of times of flight, a composite peak portion estimation unit that estimates presence of a composite peak portion in the histogram, the composite peak portion being a peak portion at which the received light intensity changes from an increasing state to a decreasing state with respect to the time of flight with reference to a peak time of flight and which is obtained from a combination of distributions of intensity of light from a plurality of objects, and differences of distances to the plurality of objects from the distance measurement device being within a predetermined range, a time of flight specification unit that specifies two times of flight matching with a first threshold received light intensity and a received light intensity of noise light including background light, the first threshold received light intensity being higher than the received light intensity of noise light, and the two times of flight including a rise time as the time of flight that is shorter and a fall time as the time of flight that is longer, a base time of flight determination unit that, when estimating that the composite peak portion is present, determines a base time of flight that is a base for calculating the object distance based on the rise time or the fall time specified concerning the composite peak portion, and when estimating that the composite peak portion is not present, determines the base time of flight as an intermediate time between the rise time and the fall time, and a distance calculation unit that uses the base time of flight to calculate a distance to one of the plurality of objects as the object distance.

3. A distance measurement device, comprising:

a light emitting unit that emits pulsed light;

a light receiving unit that receives light including reflected light due to the pulsed light; and a calculation unit that uses a time of flight of the light received by the light receiving unit to calculate an object distance as a distance to an object that reflects the pulsed light and outputs the reflected light, the calculation unit including:

a histogram generation unit that generates a histogram representing received light intensity at the light receiving unit for each of a plurality of times of flight, a composite peak portion estimation unit that estimates presence of a composite peak portion in the histogram, the composite peak portion being a peak portion at which the received light intensity changes from an increasing state to a decreasing state with respect to the time of flight with reference to a peak time of flight and which is obtained from a combination of distributions of intensity of light from a plurality of objects, and differences of distances to the plurality of objects from the distance measurement device being within a predetermined range, a time of flight specification unit that specifies two times of flight matching with a first threshold received light intensity and a received light intensity of noise light including background light, the first threshold received light intensity being higher than the received light intensity of noise light, and the two times of flight including a rise time as the time of flight that is shorter and a fall time as the time of flight that is longer, a base time of flight determination unit that, when estimating that the composite peak portion is present, determines the rise time as the base time of flight, and a distance calculation unit that uses the base time of flight to calculate a distance to one of the plurality of objects as the object distance.

4. A distance measurement device, comprising;

a light emitting unit that emits pulsed light;

a light receiving unit that receives light including reflected light due to the pulsed light;

a housing that has a window that transmits the pulsed light and the light received by the light receiving unit and accommodates the light emitting unit and the light receiving unit; and a calculation unit that uses a time of flight of the light received by the light receiving unit to calculate an object distance as a distance to an object that reflects the pulsed light and outputs the reflected light, the calculation unit including:

a histogram generation unit that generates a histogram representing received light intensity at the light receiving unit for each of a plurality of times of flight, a composite peak portion estimation unit that estimates presence of a composite peak portion in the histogram, the composite peak portion being a peak portion at which the received light intensity changes from an increasing state to a decreasing state with respect to the time of flight with reference to a peak time of flight and which is obtained from a combination of distributions of intensity of light from a plurality of objects, and differences of distances to the plurality of objects from the distance measurement device being within a predetermined range, a time of flight specification unit that specifies two times of flight matching with a first threshold received light intensity and a received light intensity of noise light including background light, the first threshold received light intensity being higher than the received light intensity of noise light, and the two times of flight including a rise time as the time of flight that is shorter and a fall time as the time of flight that is longer, a base time of flight determine unit that determines a base time of flight that is a base for calculating the object distance based on the rise time or the fall time specified concerning the composite peak portion, and a distance calculation unit that uses the base time of flight to calculate a distance to one of the plurality of objects as the object distance, wherein the composite peak portion estimation unit estimates presence of a first composite peak portion as the composite peak portion, the first composite peak portion including clutter, which is reflected light due to the pulsed light in an interior of the housing and reflected light due to the pulsed light from an external object outside the distance measurement device, and when it is determined that the first composite peak portion is present, the base time of flight determination unit determines the base time of flight based on the fall time.

5. The distance measurement device according to claim 1, further comprising an intermediate time specification unit that specifies, in the composite peak portion, a first intermediate time between two times of flight that match with the first threshold received light intensity and a second intermediate time between two times of flight that match with a second threshold received light intensity, wherein the composite peak portion estimation unit estimates presence of a second composite peak portion as the composite peak portion, the second composite peak portion including reflected light due to the pulsed light from a plurality of external objects outside the distance measurement device, and when it is estimated that the second composite peak portion is present, the base time of flight determination unit determines the base time of flight based on the rise time if the first intermediate time is earlier than the second intermediate time, and the base time of flight determination unit determines the base time of flight based on the fall time when the first intermediate time is later than the second intermediate time.

6. The distance measurement device according to claim 1, further comprising an intermediate time specification unit that specifies, in the composite peak portion, a first intermediate time between two times of flight that match with a third threshold received light intensity different from the first threshold received light intensity and a second intermediate time between two times of flight that match with a second threshold received light intensity lower than the first threshold received light intensity, wherein the composite peak portion estimation unit estimates presence of a second composite peak portion as the composite peak portion, the second composite peak portion including reflected light due to the pulsed light from a plurality of external objects outside the distance measurement device, and when it is estimated that the second composite peak portion is present, the base time of flight determination unit determines the base time of flight based on the rise time if the first intermediate time is earlier than the second intermediate time, and the base time of flight determination unit determines the base time of flight based on the fall time when the first intermediate time is later than the second intermediate time.

7. The distance measurement device according to claim 5, wherein when it is estimated that the second composite peak portion is present, the base time of flight determination unit determines the base time of flight based on the rise time or the fall time when the first intermediate time is equal to the second intermediate time.

8. The distance measurement device according to claim 4, wherein the base time of flight determination unit determines when a received light position of light including the reflected light agrees with a set clutter position, and determines the base time of flight when determining that the received light position agrees with the clutter position, 5 the distance calculation unit calculates the object distance when it is determined that the received light position agrees with the clutter position, the histogram generation unit generates the histogram for one or more pixels, units of light reception by the light 10 receiving unit, the distance calculation unit calculates the object distance for the one or more pixels, and the distance measurement device further includes a clutter position setting unit that sets the clutter position based 15 on at least one of a statistic of received light intensity of the one or more pixels and a statistic of the object distance calculated for the one or more pixels.

\* \* \* \* \*